United States Patent
Kakuta

(10) Patent No.: US 7,826,639 B2
(45) Date of Patent: Nov. 2, 2010

(54) METHOD FOR DISPLAYING AN IDENTIFIED REGION TOGETHER WITH AN IMAGE, PROGRAM EXECUTABLE IN A COMPUTER APPARATUS, AND IMAGING APPARATUS

(75) Inventor: Yuko Kakuta, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 11/622,131

(22) Filed: Jan. 11, 2007

(65) Prior Publication Data

US 2007/0177765 A1 Aug. 2, 2007

(30) Foreign Application Priority Data

Jan. 31, 2006 (JP) .............................. 2006-022507

(51) Int. Cl.
*G06K 9/00* (2006.01)
*G06T 7/00* (2006.01)
(52) U.S. Cl. ................. 382/103; 348/169; 348/208.14; 348/333.03
(58) Field of Classification Search ................. 382/103; 348/169, 208.14, 333.03
See application file for complete search history.

(56) References Cited

U.S. PATENT DOCUMENTS

| 5,434,617 A | * | 7/1995 | Bianchi | 348/170 |
| 5,982,912 A | | 11/1999 | Fukui et al. | |
| 7,035,764 B2 | * | 4/2006 | Rui et al. | 702/179 |
| 2003/0071908 A1 | | 4/2003 | Sannoh et al. | |
| 2004/0207743 A1 | | 10/2004 | Nozaki et al. | |
| 2005/0129278 A1 | * | 6/2005 | Rui et al. | 382/103 |
| 2005/0212913 A1 | * | 9/2005 | Richter | 348/170 |
| 2006/0028552 A1 | * | 2/2006 | Aggarwal et al. | 348/169 |
| 2006/0029265 A1 | * | 2/2006 | Kim et al. | 382/118 |
| 2006/0120564 A1 | * | 6/2006 | Imagawa et al. | 382/103 |
| 2007/0086621 A1 | * | 4/2007 | Aggarwal et al. | 382/103 |

FOREIGN PATENT DOCUMENTS

| JP | 09-251534 A | 9/1997 |
| JP | 10-162118 A | 6/1998 |
| JP | 2003-107335 A | 4/2003 |
| JP | 2004-317699 A | 11/2004 |
| JP | 2004-320286 A | 11/2004 |

* cited by examiner

*Primary Examiner*—Jon Chang
(74) *Attorney, Agent, or Firm*—Canon U.S.A., Inc. I.P. Division

(57) ABSTRACT

When a main shooting subject is moving, the movement of the main shooting subject naturally viewed and recognized by a user is different from an actual frequent movement of the main shooting subject. If the display of an object identification mark accurately follows up a moving object, the visibility of the mark may deteriorate. The present invention provides a display method for differentiating the follow-up response characteristics of the mark depending on a shift direction of a main shooting subject. For example, the follow-up response of the mark is lowered if a main shooting subject causes an up-and-down motion.

17 Claims, 15 Drawing Sheets

METHOD FOR DISPLAYING AN IDENTIFIED REGION TOGETHER WITH AN IMAGE, PROGRAM EXECUTABLE IN A COMPUTER APPARATUS, AND IMAGING APPARATUS

BACKGROUND OF THE INVENTION

1. Field of the Invention

The present invention relates to a technique capable of identifying the position of an identification object from image data and displaying the identification object position on an image produced based on the image data.

2. Description of the Related Art

A conventional technique can register feature data representing a main shooting subject (i.e., an identification object satisfying predetermined conditions) beforehand, and identify the main shooting subject based on a comparison between captured image data and the registered feature data.

For example, as discussed in Japanese Patent Application Laid-open No. 09-251534, a face region can be identified based on correlation values between image data of an identification object and pre-registered face image data.

Furthermore, as discussed in Japanese Patent Application Laid-open No. 10-162118, image data can be divided into a plurality of frequency band components and a face region can be estimated. Then, correlation values between the estimated face region and pre-registered face image data can be calculated. These techniques are applicable to a camera.

For example, Japanese Patent Application Laid-open No. 2003-107335 discloses a camera that can automate the processes of detecting a main shooting subject from obtained image data using a shape analysis, displaying a focus detection area corresponding to the detected main shooting subject, and performing a focus adjustment action applied to the focus detection area.

As discussed in Japanese Patent Application Laid-open No. 2004-317699, a face region (i.e., main shooting subject) can be identified by extracting feature points from image data and a focus detection area can be set according to the size of the identified region.

Moreover, as discussed in Japanese Patent Application Laid-open No. 2004-320286, a face region can be identified by extracting feature points from image data and a zoom control can be performed based on the size of the identified region.

In general, a region identifying a main shooting subject (hereinafter, referred to as "identified region") can be displayed to enable a user to easily check a shooting subject identified from image data.

According to the above-described Japanese Patent Application Laid-open Nos. 2003-107335 and 2004-317699, a face frame surrounding the identified region can be displayed to let a user recognize the identified face region.

If a main shooting subject is moving, it is useful to periodically detect a main shooting subject and update a frame indicating an identified region (hereinafter, referred to as "object identification mark"). More specifically, if a main shooting subject is shifting, the mark can be momentarily updated to follow up the moving shooting subject. When the update period of the mark is short, the mark can speedily follow up the shooting subject although the response is dependent on a calculation speed.

However, the following problems will arise if the update period of the mark is short. For example, when a main shooting subject (i.e., object) is walking or running, the main shooting subject causes an up-and-down motion as shown in FIG. 14. In general, human eyes can easily recognize a lateral (advancing) shift motion of a walking or running subject.

However, it is difficult to recognize an up-and-down motion of a walking subject. For example, if a human face is set as a main shooting subject and the update period is short, the mark indicating a walking or running subject will frequently swing in the up-and-down direction as shown in FIG. 15. The display of an image frequently swinging in the up-and-down direction is not similar to actual recognition by a user and unnatural for a user to view.

To overcome the above-described problem, the update period of the mark can be enlarged. However, if the update period is long, a user may feel that the mark cannot smoothly follow up a moving object. Moreover, if a shift distance of a main shooting subject is short, it may be desirable to fix the mark. However, the mark does not start shifting before the main shooting subject shifts a certain distance. Thus, a user may feel that the mark cannot smoothly follow up a moving subject.

Therefore, to improve the visibility of the mark, the movement of the mark indicating an identified region of a main shooting subject is required to naturally follow up the movement of a main shooting subject recognized by a user.

SUMMARY OF THE INVENTION

Various exemplary embodiments, features and aspects of the present invention are directed to the display of an object identification mark indicating an identified region of a main shooting subject that can naturally follow up the movement of the main shooting subject recognized by a user, and as a result can improve the visibility of the mark.

An aspect of the present invention provides a method for displaying an image including obtaining, from image data, an identified region corresponding to an identification object satisfying a predetermined condition; creating an object identification mark indicating the identified region; and causing a display unit to display a composite image, including the mark and an image produced based on the image data, such that the mark can follow up the identified region with response characteristics differentiated depending on a shift direction of the identified region.

Another aspect of the present invention provides a storage medium storing program code executable by a computer apparatus. The medium includes computer-executable instructions for obtaining, from image data, an identified region corresponding to an identification object satisfying a predetermined condition; computer-executable instructions for creating an object identification mark indicating the identified region; and computer-executable instructions for causing a display unit to display a composite image, including the mark and an image produced based on the image data, such that the mark can follow up the identified region with response characteristics differentiated depending on a shift direction of the identified region.

Yet another aspect of the present invention provides an imaging apparatus which includes an acquisition unit configured to obtain an identified region corresponding to an identification object satisfying a predetermined condition from image data obtained by an image sensor; a creation unit configured to create an object identification mark indicating the identified region; and a display control unit configured to cause a display unit to display a composite image including the mark and an image produced based on the image data, such that the mark can follow up the identified region with response characteristics differentiated depending on a shift direction of the identified region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
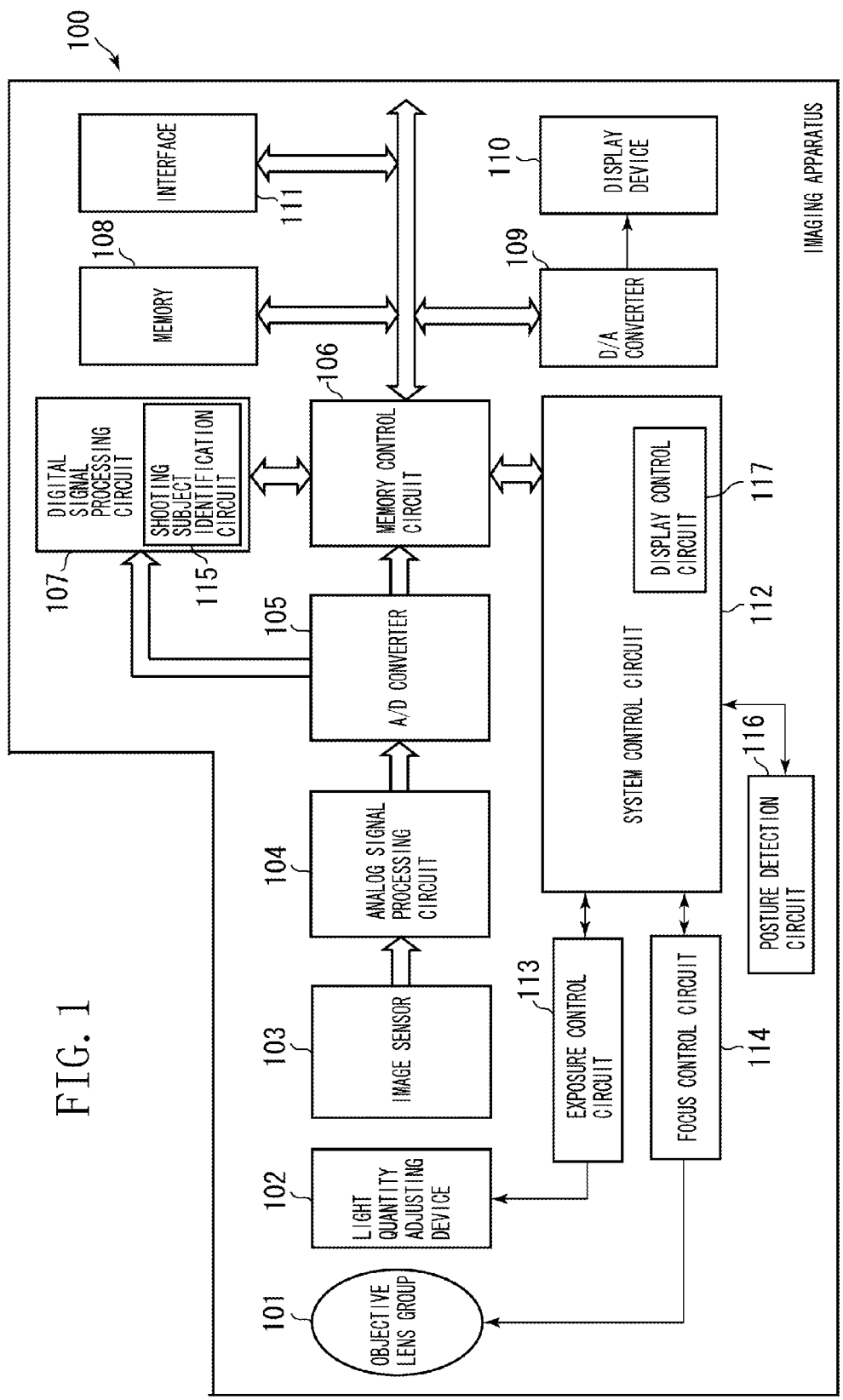
FIG. 1 is a block diagram illustrating an example imaging apparatus according to a first exemplary embodiment.

The following description of exemplary embodiments, features and aspects of the present invention is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Exemplary embodiments, features and aspects of the present invention will now herein be described in detail below with reference to the drawings.

First Exemplary Embodiment

FIG. 1 is a block diagram illustrating an imaging apparatus 100 according to a first exemplary embodiment. In the present exemplary embodiment, a device possessing the capability of displaying an identified region of a main shooting subject is an electronic still camera or any other device (e.g., a video camera or a monitoring camera) that can process moving images.

The imaging apparatus 100 includes an objective lens group 101, a light quantity adjuster 102 incorporating a diaphragm apparatus and a shutter apparatus, an image sensor 103 (e.g., CCD or CMOS) that can convert light flux (i.e., subject image) having passed through the objective lens group 101 into an electric signal, and an analog signal processing circuit 104 that can apply clamp processing and gain processing to an analog signal produced from the image sensor 103.

Furthermore, the imaging apparatus 100 includes an analog/digital (hereinafter, referred to as A/D) converter 105 that can convert an output of the analog signal processing circuit 104 into a digital signal. The output data of the A/D converter 105 is written into a memory 108 via a digital signal processing circuit 107 and a memory control circuit 106, or via only the memory control circuit 106.

The digital signal processing circuit 107 can apply pixel interpolation processing and color conversion processing to the data produced from the A/D converter 105 or to the data produced from the memory control circuit 106. The digital signal processing circuit 107 can calculate a value indicating a focused state of a shooting subject or a luminance value, and can adjust a white balance based on the image data obtained from the A/D converter 105.

The digital signal processing circuit 107 includes a shooting subject identification circuit 115 that stores feature data of a main shooting subject beforehand and can identify a main shooting subject based on comparison between the image data and the feature data.

In the present exemplary embodiment, the shooting subject identification circuit 115 can identify a region where a human face is present based on detection of features of a face (e.g., eyes, a mouth, or the like) from the data obtained from the A/D converter 105 or the data stored in the memory 108. The features of a face are registered as feature data. In the context of the present disclosure, the region where a human face (i.e., main shooting subject) is present is referred to as "identified region."

A system control circuit 112 can control an exposure control circuit 113 and a focus control circuit 114 based on calculation results of the digital signal processing circuit 107. More specifically, the system control circuit 112 performs focus control processing, exposure control processing, light adjustment processing applied to the light flux of a shooting subject having passed through the objective lens group 101.

Furthermore, the system control circuit 112 includes a display control circuit 117 that can control an object identification mark indicating an identified region based on the identification result obtained by the shooting subject identification circuit 115.

The memory control circuit 106 can control the analog signal processing circuit 104, the A/D converter 105, the digital signal processing circuit 107, the memory 108, and a digital/analog (hereinafter, referred to as "D/A")converter 109.

The A/D converted data of the A/D converter 105 is written into the memory 108 via the digital signal processing circuit 107 and the memory control circuit 106, or via only the memory control circuit 106. The memory 108 stores the data to be displayed on a display unit 110. The display unit 110 can display the data sent from the memory 108 via the D/A converter 109.

Furthermore, the memory 108 stores still images and moving images captured by the imaging apparatus. The memory 108 can function as a work region of the system control circuit 112. The display unit 110, including a liquid crystal monitor, can display image data obtained in a shooting operation. The display unit 110 can function as an electronic viewfinder that successively displays captured image data (i.e., shooting subject) obtained by the imaging sensor 103.

The display unit 110 can arbitrarily turn the display of image on or off in response to an instruction given from the system control circuit 112. When the display unit 110 is in an OFF state, the imaging apparatus 100 can reduce electric power consumption. Furthermore, the display unit 110 can display an operation state and a message with images and characters in accordance with the commands of the system control circuit 112.

An interface 111 can control communications between the imaging apparatus 100 and an external storage medium (e.g., a memory card or a hard disk). The imaging apparatus 100 can transfer or receive image data and management information via the interface 111 to or from a peripheral device (e.g., other computer or a printer).

It is also noted that the interface 111 can be configured to operate in conformity with the protocol of a PCMCIA card or a Compact Flash™ card, and various types of communication cards can be inserted into a card slot of the interface 111. For example, the communication card can be selected from a LAN card, a modem card, a USB card, an IEEE1394 card, a P1284 card, a SCSI card, and a PHS card.

A posture detection circuit 116 can detect the imaging apparatus 100 and output the detection result to the system control circuit 112. The system control circuit 112 can control the entire action of the imaging apparatus 100. The system control circuit 112 includes a memory (not shown) that stores constants, variables, and programs required for the system control circuit 112 to perform various actions.

The exposure control circuit 113 can drive the diaphragm apparatus and the shutter apparatus equipped in the light quantity adjuster 102. The focus control circuit 114 can drive a focusing lens and a zoom lens of the objective lens group 101.

Figure 2:
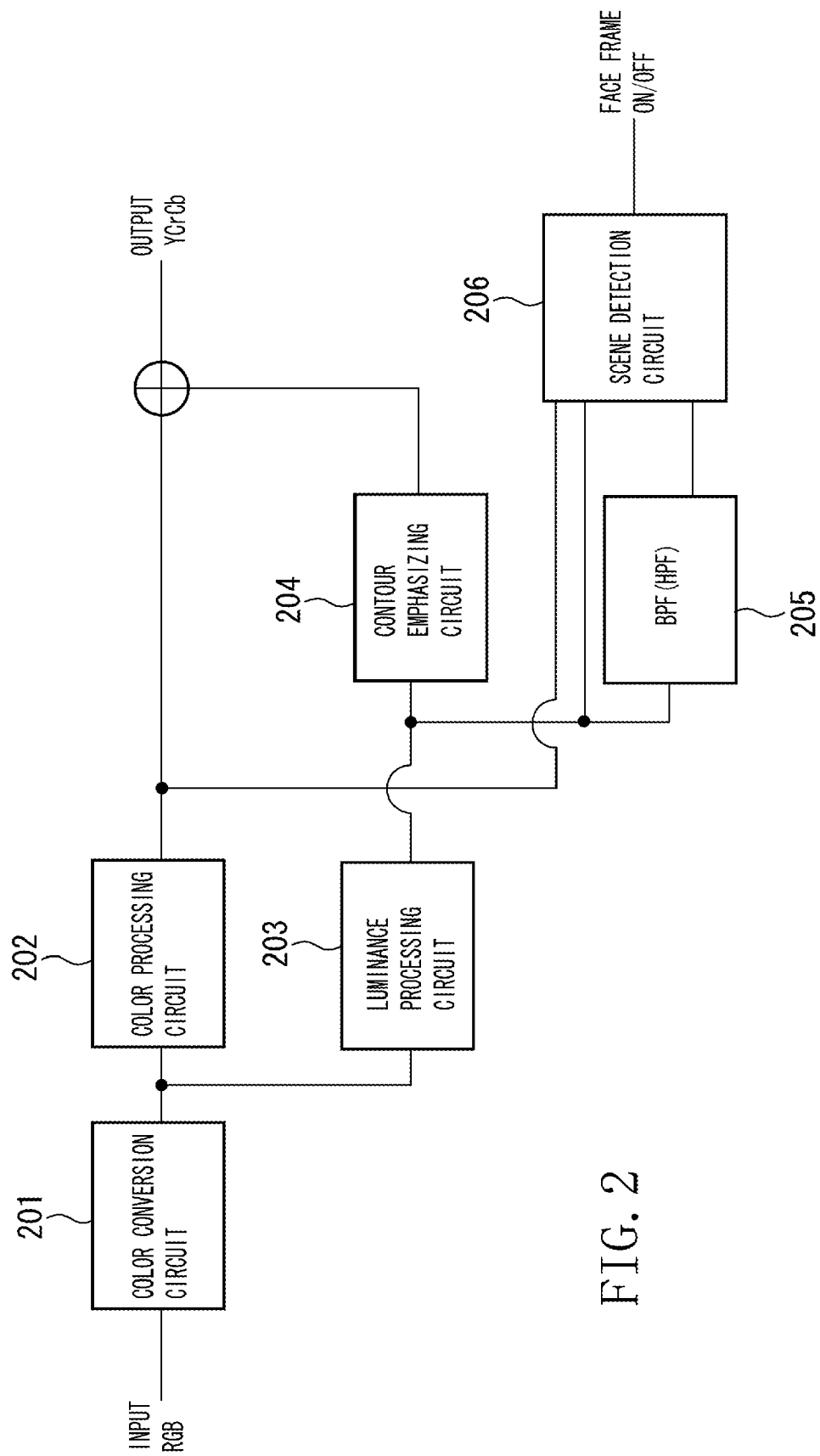
FIG. 2 is a circuit diagram illustrating part of a digital signal processing circuit of the imaging apparatus according to the first exemplary embodiment.

FIG. 2 is a circuit diagram illustrating an exemplary part of the digital signal processing circuit 107. A color conversion circuit 201 can separate a RGB signal entered from the A/D converter 105 into a luminance signal Y and chrominance signals Cr and Cb. A color processing circuit 202 can apply white balance processing to the chrominance signals Cr and Cb and execute achromatic processing for thinning the color of high luminance or low luminance. A luminance processing circuit 203 can apply filter processing, luminance correction processing, and gamma processing to the luminance signal Y.

A contour emphasizing circuit 204 can apply filter processing to the luminance signal to emphasize the contour. A band-pass filter (BPF), or a high-pass filter (HPF), 205 can extract a high-frequency signal from the luminance signal having been subjected to the luminance processing. A scene detection circuit 206 can detect a scene change in a shooting operation. The digital signal processing circuit 107 can combine the luminance signal Y with the chrominance signals Cr and Cb and output a combined YCrCb signal as image data.

FIGS. 3 through 7 are flowcharts illustrating example actions of an electronic camera according to the present exemplary embodiment. The program for executing the processing is stored in the memory of the system control circuit 112 and can be executed under the control of the system control circuit 112.

[Exemplary Main Processing Routine]

Figure 3:
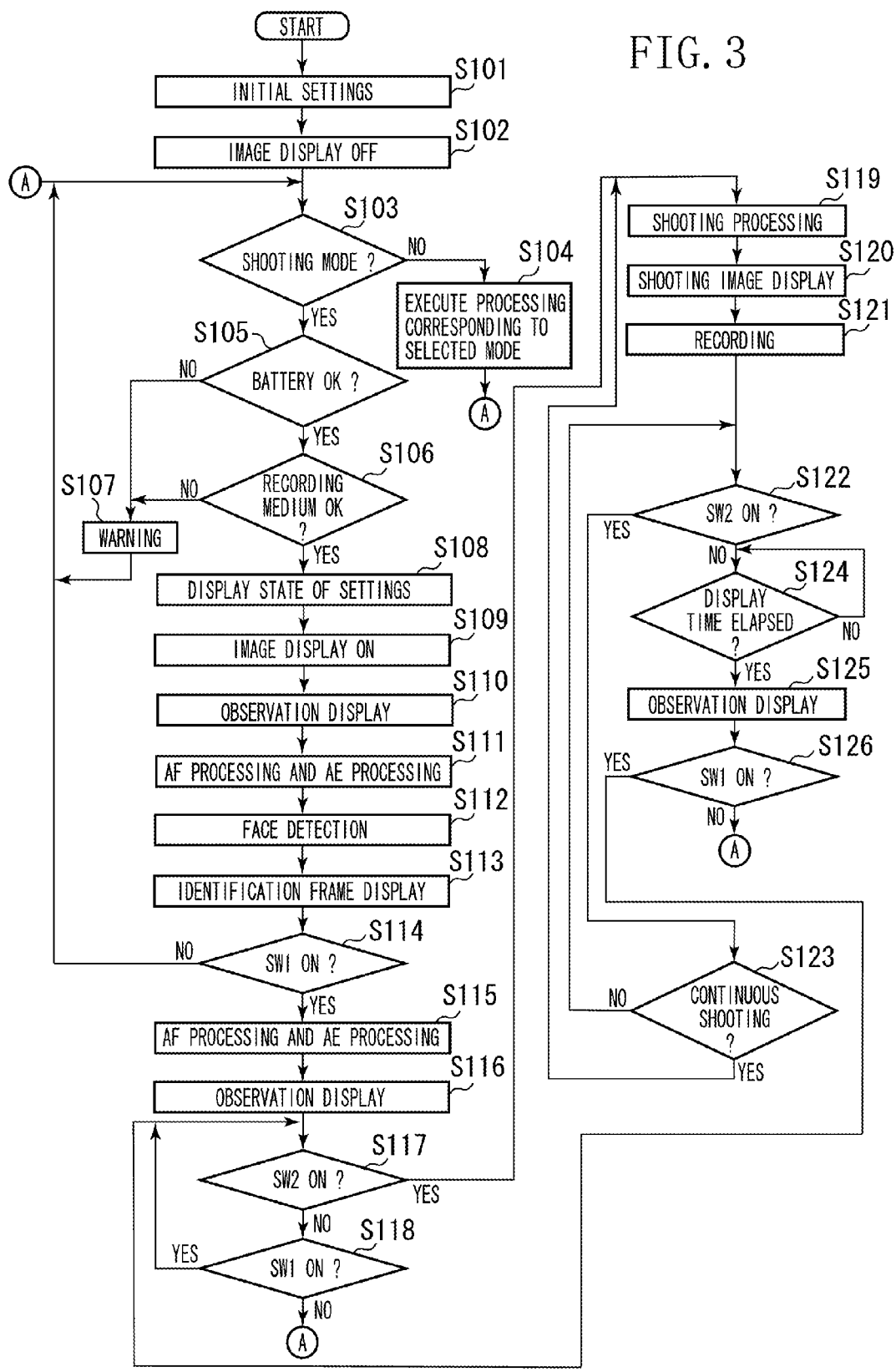
FIG. 3 is a flowchart illustrating an example main processing routine in the imaging apparatus according to the first exemplary embodiment.

FIG. 3 is a flowchart illustrating an example main processing routine performed in the imaging apparatus 100 according to the present exemplary embodiment. The processing shown in FIG. 3 can be started, for example, in response to a turning-on operation of a power source immediately after a battery is replaced.

First, in step S101, the system control circuit 112 initializes various flags and control variables stored in its memory. In step S102, the system control circuit 112 turns the image display of the display unit 110 to an OFF state as initial settings. Next, in step S103, the system control circuit 112 determines whether a shooting mode is selected for the imaging apparatus 100 that can execute a shooting operation and record image data.

If the shooting mode is not selected (i.e., NO in step S103), the processing flow proceeds to step S104. In step S104, the system control circuit 112 executes required processing corresponding to the selected mode which is different from the shooting mode. Then, the processing flow returns to step S103.

If the shooting mode is selected (i.e., YES in step S103), the processing flow proceeds to step S105. In step S105, the system control circuit 112 determines whether a remaining capacity or an operation state of the electric power source is in a warning level which may cause malfunctions in the imaging apparatus 100.

If the system control circuit 112 determines that the power source is in the warning level (NO at step S105), the processing flow proceeds to step S107. In step S107, the system control circuit 112 causes the display unit 110 to perform a predetermined warning display with images and sounds. Then, the processing flow returns to step S103.

When the system control circuit 112 determines that the power source is not in the warning level (YES at step S105), the processing flow proceeds to step S106. In step S106, the system control circuit 112 determines whether an operation state of the storage medium is in a warning level according to which the imaging apparatus 100 may fail in recording and playback of image data.

If the system control circuit 112 determines that the storage medium is in the warning level (NO at step S106), the processing flow proceeds to the above-described step S107 to cause the display unit 110 to perform a predetermined warning display with images and sounds. Then, the processing flow returns to step S103.

When the system control circuit 112 determines that the storage medium is not in the warning level (YES at step S106), the processing flow proceeds to step S108. In step S108, the system control circuit 112 causes the display unit 110 to display the state of various settings of the imaging apparatus 100 with images and sounds. This is referred to as user interface (i.e., UI) display. Thus, a user can perform various settings.

Next, in step S109, the system control circuit 112 turns the display unit 110 to an ON state. Furthermore, in step S110, the system control circuit 112 causes the display unit 110 to start an observation display for successively displaying images produced from image data obtained by the image sensor 103. In the observation display state, the display unit 110 can function as an electronic viewfinder which can successively display image data stored in the memory 108.

In step S111, the system control circuit 112 executes focus control processing and exposure control processing based on obtained image data. If the information relating to the identified region, i.e., a region where a face is present (hereinafter, referred to as "face region") is already obtained, the system control circuit 112 can execute the focus control processing for the detected identified region.

Although described in detail later, the latest mark displayed on the display unit 110 may disagree with the latest identified region. In this case, the system control circuit 112 can apply the focus control processing and the exposure control processing to the identified region not to the mark. More specifically, in the present exemplary embodiment, the region where the focus control processing and the exposure control processing are applied may disagree with the mark.

In step S112, the system control circuit 112 causes the shooting subject identification circuit 115 to start face identification processing for identifying a face region from the image data. To reduce the calculation time for the face identification processing, it is desirable to reduce the total number of image data used for identification, for example, by appropriately thinning out the image data of the identification object.

As a technique for detecting a face region, various methods are available. For example, a neural network is a representative method for detecting a face region based on a learning technique. Furthermore, a template matching can be used to extract features representing eyes, a nose, a mouth or any other physical shape from an image region.

Furthermore, according to another conventional method, the quantity of features, such as a skin color or an eye shape, can be detected from an image and can be analyzed using a statistical method (for example, refer to Japanese Patent Application Laid-open No. 10-232934 or Japanese Patent Application Laid-open No. 2000-48184).

Furthermore, it is useful to check the position of a previously detected face region, or check a clothing color in the vicinity of a face region, or lower a threshold of face identification in a central region of a screen. Moreover, it is useful to use a histogram designating a main shooting subject region and color information beforehand and obtain correlation values to follow up the main shooting subject.

The present exemplary embodiment performs the face detection processing using a method for detecting a pair of eyes (both eyes), a nose, a mouse, a mouth, and a face contour and determining a human face region based on detected relative positions. Then, the present exemplary embodiment sets a rectangular region surrounding the face region according to the size of a detected face region and obtains coordinate values of the rectangular region.

The coordinate values of the rectangular region surrounding the face region represent the identified region of an object (i.e., the position of a main shooting subject). The region surrounding a face region is not limited to a rectangular shape and can be an elliptic or other shape capable of surrounding the contour of a detected face.

In step S113, the system control circuit 112 receives the identification result from the shooting subject identification circuit 115 and causes the digital signal processing circuit 107 to execute identified region display processing for displaying the identified region.

Details of the identified region display processing of step S113, i.e., characteristic features of the present exemplary embodiment, will be described in detail with reference to a flowchart of FIG. 4. In the exemplary embodiment, if the settings for turning off the observation display state are determined beforehand, the processing of steps S109, S110, and step S113 can be omitted.

In step S114, the system control circuit 112 determines whether the shutter switch SW1 is in a pressed state. If the shutter switch SW1 is in a no-pressed state (NO at step S114), the processing flow returns to step S103. When the shutter switch SW1 is in a pressed state (YES in step S114), the processing flow proceeds to step S115.

In step S115, the system control circuit 112 causes the exposure control circuit 113 to perform an exposure control so that the luminance value of the identified region becomes an appropriate value. It is also useful to allocate a large weighting factor to the identified region so that the luminance value of the entire screen becomes an appropriate value.

In this case, the system control circuit 112 can activate a flashlight device (not shown) in a shooting operation, if necessary, depending on the result of exposure control. Furthermore, the white balance may become inappropriate depending on the skin color. To prevent this drawback, it is useful to exclude the identified region, or allocate a small weighting factor to the identified region to appropriately adjust the white balance. Furthermore, the system control circuit 112 causes the focus control circuit 114 to perform the focus control so that the identified region becomes a focused state.

In step S116, the system control circuit 112 continues the observation display state until a user presses a shutter switch SW2. Next, in step S117, the system control circuit 112 determines whether the shutter switch SW2 is in an ON or OFF state (i.e., pressed state). If the shutter switch SW2 is in an OFF (non-pressed state) (NO at step S117) and the shutter switch SW1 is in an OFF state (i.e., released) (NO at step S118), the processing flow returns to step S103. On the other hand, if the shutter switch SW2 is in an ON state (i.e., pressed) (YES at step S117), the processing flow proceeds to step S119. Or in the alternative, if the shutter switch SW2 is in an OFF (non-pressed state) (NO at step S117) and the shutter switch SW1 is in an ON state (i.e., not released) (YES at step S118), the processing flow returns to step S117.

In step S119, the system control circuit 112 performs shooting processing for storing captured image data into the memory 108. The exposure control circuit 113 drives the diaphragm apparatus according to the exposure control result in step S115 and opens the shutter to expose the image sensor 103 to the light. Then, the exposure control circuit 113 causes a flashlight apparatus to emit light, if necessary, and closes the shutter when a preset exposure time has elapsed.

The electric charge signal produced from the image sensor 103 is sent via the A/D converter 105, the digital signal processing circuit 107, and the memory control circuit 106, to the memory 108 (i.e., image data storage device). Furthermore, the system control circuit 112 causes the memory control circuit 106 and the digital signal processing circuit 107 to read the image data stored in the memory 108 and execute vertical addition processing.

Next, the system control circuit 112 causes the digital signal processing circuit 107 to successively perform color processing to produce display image data. Then, the system control circuit 112 causes the memory 108 to store the processed display image data. In step S120, the system control circuit 112 causes the display unit 110 to display shooting images based on the image data obtained in step S119.

In step S121, the system control circuit 112 reads the image data stored in the memory 108 and causes the memory control circuit 106 (and the digital signal processing circuit 107, if necessary) to execute various image processing. Furthermore, the system control circuit 112 executes recording processing for compressing image data and writing compressed image data into a storage medium.

After accomplishing the recording processing of step S121, the system control circuit 112 determines in step S122 whether the shutter switch SW2 is in a pressed state. If in step S122 the switch SW2 is in an ON state (i.e., pressed state) (YES in step S122), the processing flow proceeds to step S123. If in step S122 the switch SW2 is in an OFF state (i.e., non-pressed state) (NO in step S122), the process proceeds to step S124.

In step S123, the system control circuit 112 determines whether a continuous shooting flag is in an ON state. The continuous shooting flag can be stored in an internal memory of the system control circuit 112 or in the memory 108. If in step S123 the continuous shooting flag is in an ON state (YES in step S123), the processing flow returns to step S119. Then, in step S119, the system control circuit 112 causes the imaging apparatus 100 to shoot the next image to realize a continuous shooting.

If in step S123 the continuous shooting flag is in an OFF state (NO in step S123), the processing flow returns to step S122. The system control circuit 112 repeats the processing of steps S122 and S123 until the shutter switch SW2 is turned off.

If the shutter switch SW2 is turned off immediately after the recording processing of step S121 is accomplished, the processing flow proceeds to step S124 from step S122. Similarly, if a user continuously presses the shutter switch SW2 to display and confirm captured images after the recording processing of step S121 is accomplished, and then if the shutter switch SW2 is turned off, the processing flow proceeds to step S124 from step S122.

Then, in step S124, the system control circuit 112 determines whether a predetermined display time has elapsed. After the predetermined display time has elapsed (YES in step S124), the processing flow proceeds to step S125. In step S125, the system control circuit 112 causes the display unit 110 to operate in an observation display state. The processing flow proceeds to step S126. With the above-described processing, a user can confirm the captured images on the display unit 110 and the display unit 110 can start the observation display for the next shooting operation.

In step S126, the system control circuit 112 determines whether the shutter switch SW1 is in an ON state. If the shutter switch SW1 is in an ON state (YES in step S126), the processing flow proceeds to step S117 for the next shooting operation. When the shutter switch SW1 is turned off (NO in step S126), the system control circuit 112 accomplishes the sequential shooting actions. The processing flow returns to step S103.

[Exemplary Identified Region Display Processing]

Next, exemplary identified region display processing performed in step S113 of FIG. 3 (i.e., characteristic features of the present exemplary embodiment) will be described in more detail.

The present exemplary embodiment can change the update period of the mark indicating an identified region of a main shooting subject depending on a shift direction of the main shooting subject. The present exemplary embodiment can change the follow-up response characteristics of the mark depending on a shift direction of the main shooting subject.

Figure 4:
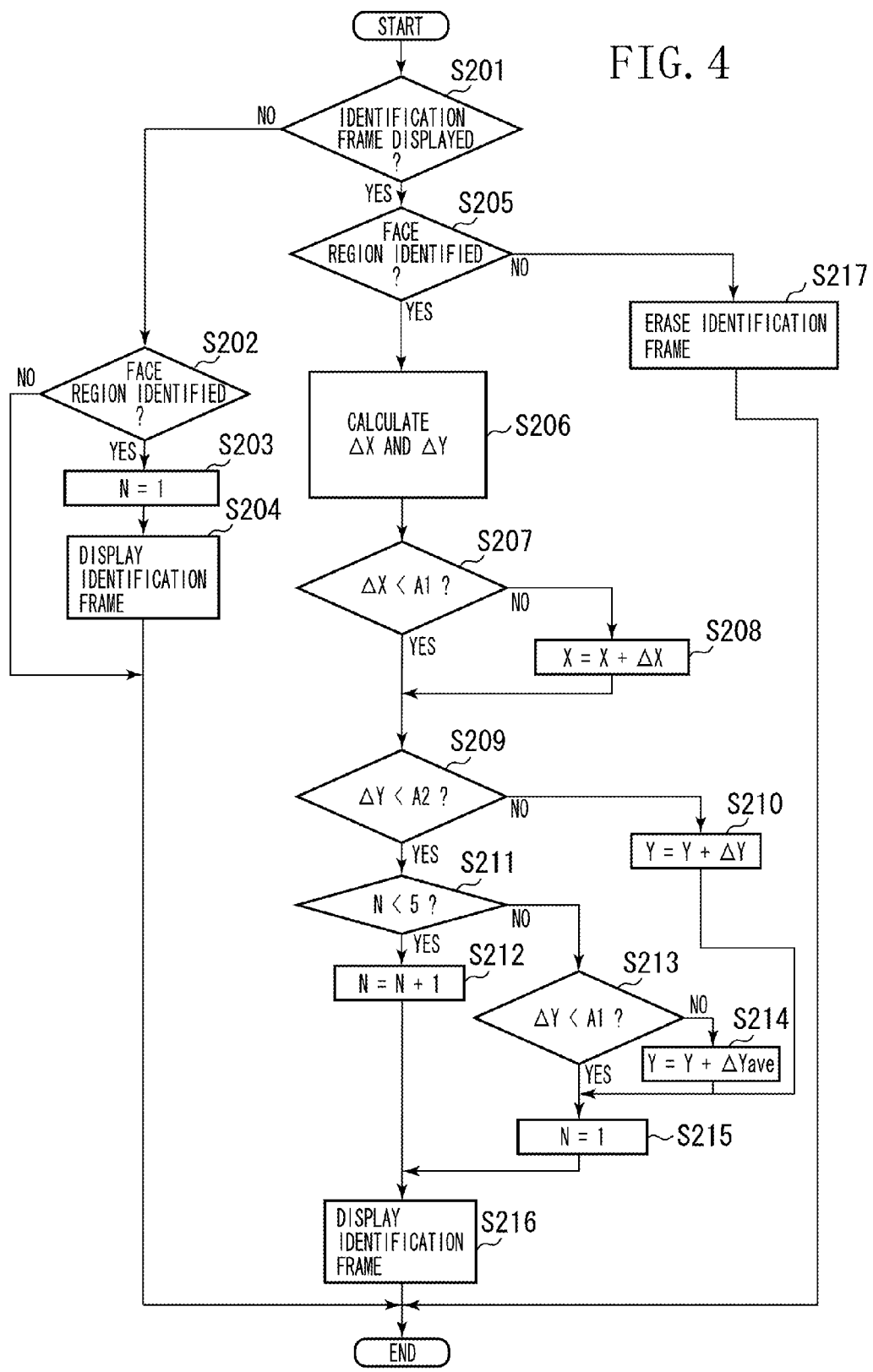
FIG. 4 is a flowchart illustrating example details of identified region display processing performed by the imaging apparatus according to the first exemplary embodiment.

FIG. 4 is a flowchart illustrating example details of the identified region display processing according to the present exemplary embodiment. In step S201, the display control circuit 117 determines whether a mark (i.e., a frame indicating an identified region) is already displayed on display unit 110 which is set in the observation display state. If the mark is not displayed (NO in step S201), the processing flow proceeds to step S202.

In step S202, the display control circuit 117 determines whether a face region is identified in step S112. If the face region detection is successful (YES in step S202), the processing flow proceeds to step S203. If the face region detection is failed (NO in step S202), the display control circuit 117 terminates the processing of this routine.

In step S203, the display control circuit 117 sets a variable N to 1. The processing flow proceeds to step S204. In step S204, the display control circuit 117 instructs the digital signal processing circuit 107 to combine the display image data stored in the memory 108 with the mark created based on the coordinate values of the identified region obtained in step S112. Next, the display control circuit 117 causes the display unit 110 to display an image of combined image data created by the digital signal processing circuit 107. Then, the display control circuit 117 terminates the processing of this routine.

Figure 10:
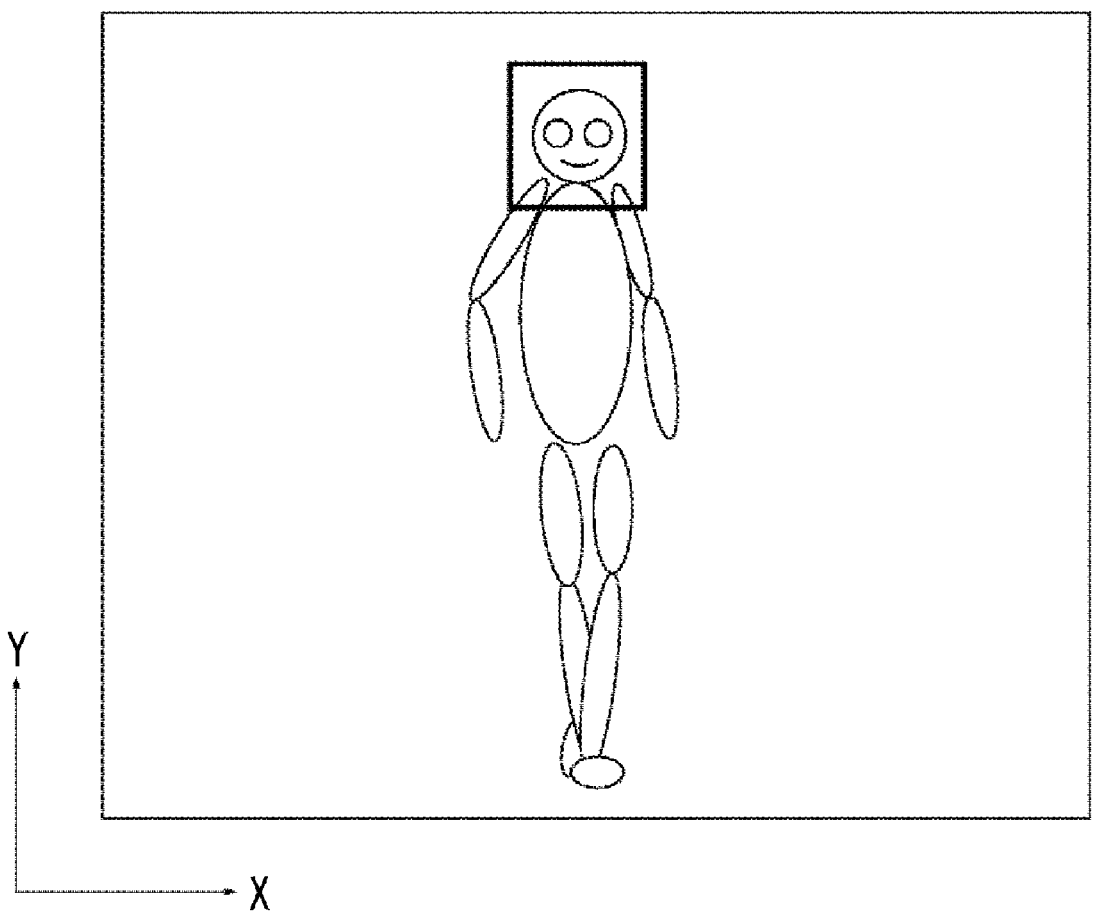
FIG. 10 is an illustration of an example display screen that shows an exemplary image of display image data combined with an object identification mark indicating the identified region according to an aspect of the present invention.

FIG. 10 illustrates an example display screen of the display unit 110 that shows an exemplary image of display image data combined with a mark indicating the identified region which is created by the digital signal processing circuit 107. It is desirable to determine the size of the mark so that the mark is sufficiently large to encompass a face of a walking subject who may move in the up-and-down direction, with reference to the size of an identified face.

More specifically, it is desirable that a face remains within the mark if the face shifts in the Y-axis direction by an amount equal to a reference value A2. Here, the X-axis is an axis extending in the horizontal direction of the screen, while the Y-axis is an axis extending in the vertical direction of the screen.

After the processing of the flowchart shown in FIG. 4 is accomplished, if in step S114 of FIG. 3 the shutter switch SW1 is not pressed (NO in step S114), the processing flow returns again to step S103 of FIG. 3. Namely, when the shutter switch SW1 is not pressed, the display control circuit 117 repeats the processing of step S110 (i.e., the processing for successive displaying captured images) through step S113 (i.e., the processing for displaying an mark). Therefore, when a human body (i.e., an identification object) moves, the mark shifts correspondingly.

Now, referring back to step S201, if the frame indicating an identified region is already displayed on the display unit 110 (YES in step S201), the processing flow proceeds to step S205. In step S205, the display control circuit 117 determines whether a face region is identified in step S112. If the face region detection is successful (YES in step S205), the processing flow proceeds to step S206. When the face region detection is failed (NO in step S205), the processing flow proceeds to step S217 in which the display control circuit 117 erases the mark and terminates the processing of this routine.

In step S206, the display control circuit 117 compares the central coordinates (X, Y) of the mark already displayed with central coordinates of the latest identified region involving the main shooting subject. Then, the display control circuit 117 separates the differences of the compared central coordinates into X-axis and Y-axis components, and obtains an X-axis difference $\Delta X$ and a Y-axis difference $\Delta Y$.

When the imaging apparatus 100 is positioned upright, an up-and-down motion of a human body occurs in the Y-axis direction. The display control circuit 117 can store five latest ΔY values, at maximum, into the internal memory (not shown) of the system control circuit 112.

In step S207, the display control circuit 117 determines whether the ΔX value obtained in step S206 is less than a reference value A1. The reference value A1 is a sufficiently small value compared to the up-and-down motion of a walking subject. If the ΔX value is equal to or greater than the reference value A1 (NO in step S207), the processing flow proceeds to step S208.

In step S208, the display control circuit 117 adds the ΔX value to the X-axis central coordinate X of the main shooting subject. In other words, the display control circuit 117 updates the X-axis central coordinate of the mark by the latest X-axis central coordinate of the identified region of the main shooting subject. Then, the processing flow proceeds to step S209.

On the other hand, when the ΔX value is less than the reference value A1 (YES in step S207), the display control circuit 117 determines that a difference between the mark and the latest identified region of the main shooting subject, in the X-axis direction, is a small and negligible value. Thus, the display control circuit 117 maintains the X-axis central coordinate of the mark. Then, the processing flow proceeds to step S209.

In step S209, the display control circuit 117 determines whether the ΔY value obtained in step S206 is less than a reference value A2. The reference value A2 is a value slightly greater than a variation width of the up-and-down motion of a walking subject.

If the ΔY value is equal to or greater than the reference value A2 (NO in step S209), the processing flow proceeds to step S210. In step S210, the display control circuit 117 determines that the identified region has changed due to a reason other than the up-and-down motion of a walking subject. Thus, the display control circuit 117 adds the ΔY value to the Y-axis central coordinate Y of the main shooting subject. In other words, the display control circuit 117 updates the Y-axis central coordinate of the mark by the latest Y-axis central coordinate of the identified region of the main shooting subject. Then the process flow proceeds to step S215.

On the other hand, when the ΔY value is less than the reference value A2 (YES in step S209), the display control circuit 117 determines that the identified region has shifted in the Y-axis direction due to the up-and-down motion of a walking subject. Then, the processing flow proceeds to step S211.

In step S211, the display control circuit 117 determines whether the variable N is less than 5. If the variable N is less than 5 (YES in step S211), the display control circuit 117 increments the variable N by 1 (refer to step S212). Then, the processing flow proceeds to step S216.

The processing of steps S211 and S212 is an operation required to wait for the elapse of a predetermined time (equivalent to five consecutive detections of the same face region). In other words, if the identified region is changed in the Y-axis direction by the up-and-down motion of a walking subject, the display control circuit 117 does not immediately shift the mark in the Y-axis direction to follow up the identified region.

The shift of the mark in the Y-axis direction can be suppressed adequately so that a user is not forced to frequently recognize the up-and-down motion of the mark caused by a walking subject.

The advancing direction of a shooting subject may be an oblique or up-and-down direction relative to the screen. A large deviation may be caused between the mark and the identified region before accomplishing five consecutive face detections. In this case, the processing flow proceeds to step S210 from step S209 before the variable N reaches 5. The mark can promptly follow up the identified region.

It is noted that the reference value in the determination step S211 is not limited to 5 and can be set to any other appropriate value selectable depending on the calculation speed of the shooting subject identification circuit 115.

If in step S211 the variable N is equal to or greater than 5 (NO in step S211), the processing flow proceeds to step S213 to update the Y-axis central coordinate of the mark by the Y-axis central coordinate of the latest identified region of the main shooting subject.

In step S213, the display control circuit 117 determines whether the ΔY value is less than the reference value A1. Namely, the display control circuit 117 determines whether a difference between the mark and the latest identified region of the main shooting subject, in the Y-axis direction, is a small and negligible value. If the ΔY value is equal to or greater than the reference value A1 (NO in step S213), the processing flow proceeds to step S214. When the ΔY value is less than the reference value A1 (YES in step S213), the display control circuit 117 maintains the Y-axis central coordinate of the mark. Then, the processing flow proceeds to step S215.

In step S214, the display control circuit 117 reads the past five ΔY values stored in the internal memory (not shown) of the system control circuit 112 and calculates an average value ΔYave of the past five ΔY values. The display control circuit 117 obtains a new Y-axis central coordinate of the mark by adding the average value ΔYave to the Y-axis central coordinate Y of the mark.

Using the average value of the past five ΔY values is useful because the mark can be adjusted to the center of the up-and-down motion of a walking subject.

In step S215, the display control circuit 117 initializes the variable N to 1 in response to the resetting of the Y-axis central coordinate of the mark. Then, the processing flow proceeds to step S216.

In step S216, the display control circuit 117 instructs the digital signal processing circuit 107 to display the maintained mark, or a new mark created based on the updated central coordinates. Then, the display control circuit 117 causes the display unit 110 to display a composite image of the image data produced from the digital signal processing circuit 107. Then, the display control circuit 117 terminates the processing of this routine.

As described above, the present exemplary embodiment sets the reference value A2 with reference to a variation width of the up-and-down motion of a walking subject, and determines whether a change of the identified region is less than the reference value A2, exclusively in the Y-axis direction corresponding to the up-and-down motion of a walking subject.

If it is determined that the change of the identified region in the Y-axis direction is caused by the up-and-down motion of a walking subject, the frequency for updating the position of the mark (indicating the identified region) can be suppressed exclusively in the Y-axis direction.

Figure 11:
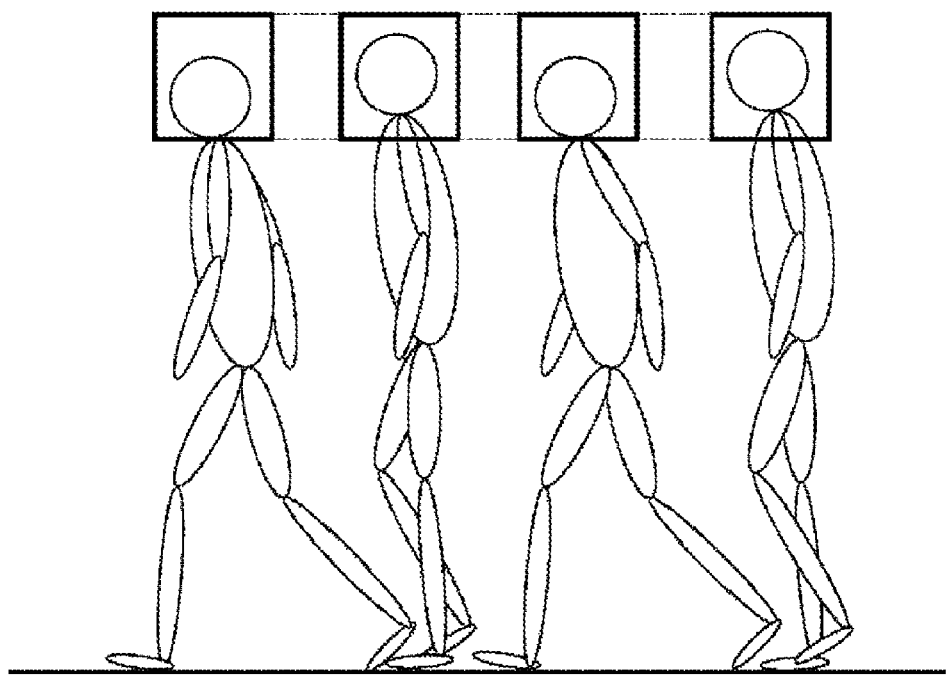
FIG. 11 is an illustration of an example position relationship between an identified region and an object identification mark in the Y-axis direction according to the first exemplary embodiment.
Figure 11:
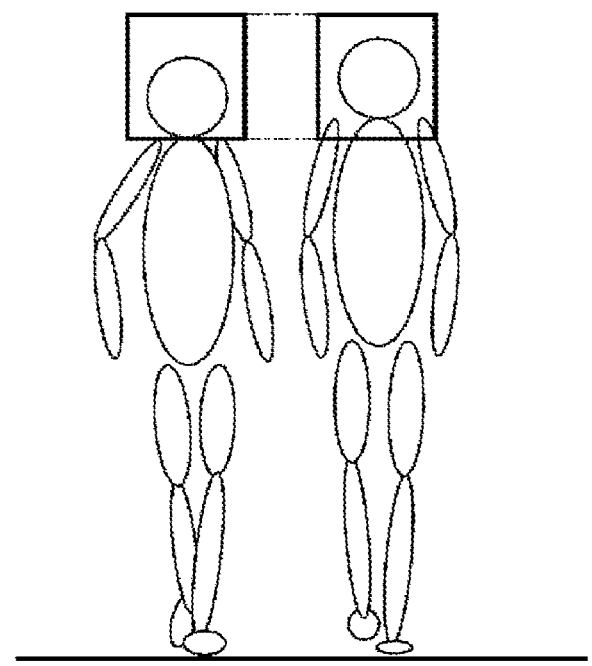

FIG. 11 illustrates a position relationship between an identified region and a mark when a main shooting subject is walking. If the change of the identified region in the Y-axis direction is less than the reference value A2, the Y-axis coordinate value of the mark does not change.

Figure 12:
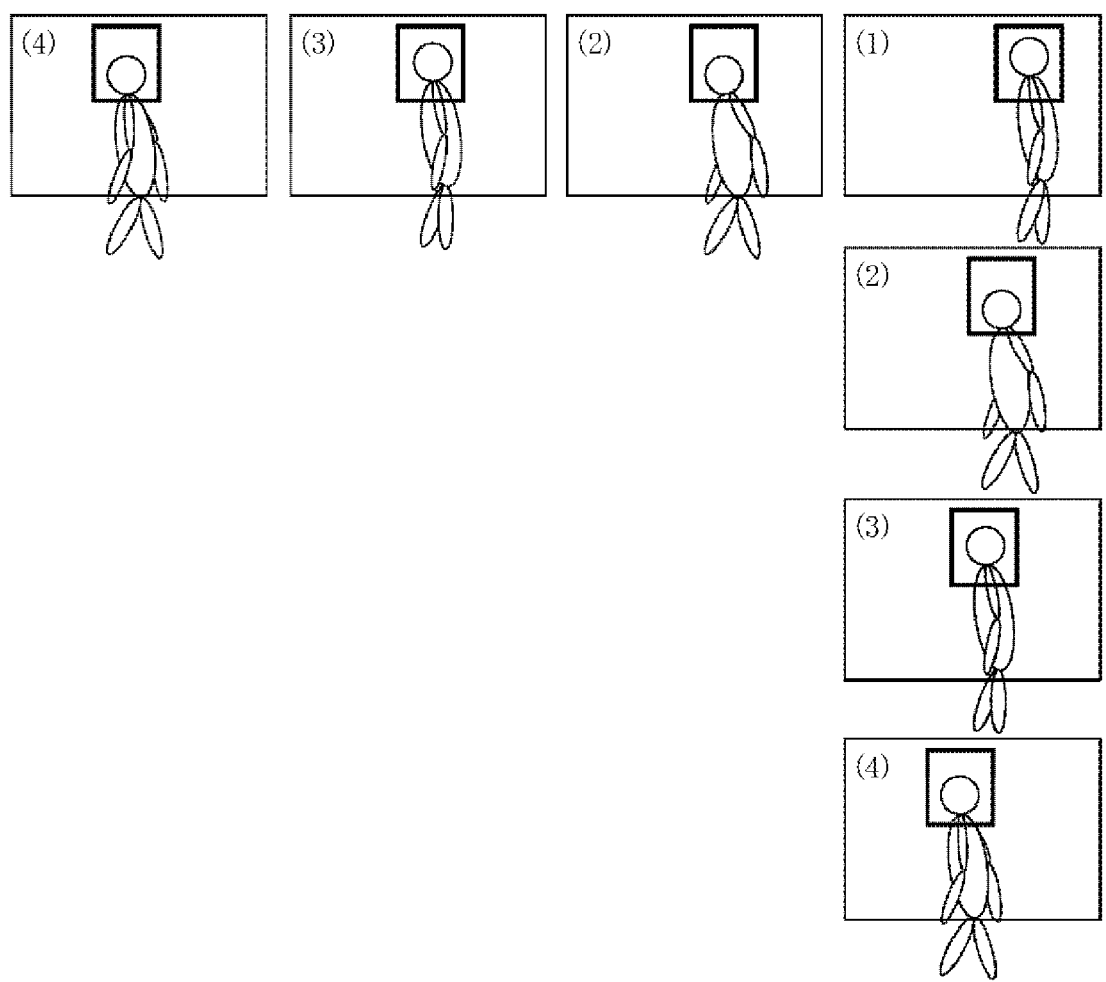
FIG. 12 is an illustration of an example position relationship between an identified region and an object identification mark in the X-axis direction and the Y-axis direction according to the first exemplary embodiment.

FIG. 12 illustrates the change of a mark in the X-axis direction and the Y-axis direction. The numeral in parentheses is a value of the variable N. When the variable N changes from 1 to 2, 3, and 4, the X-axis coordinate value of the mark is updated successively while the Y-axis coordinate value remains the same.

Figure 13:
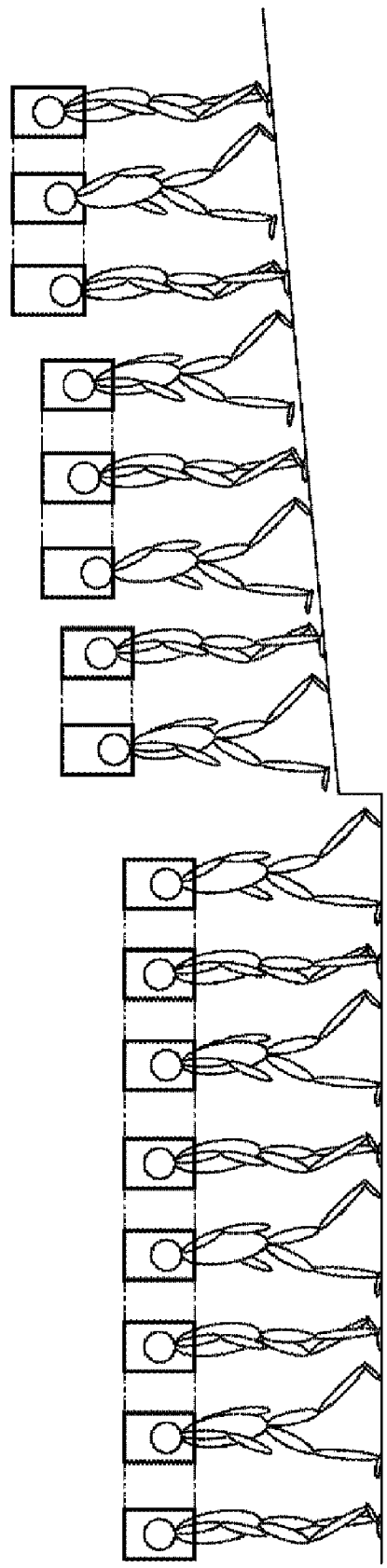
FIG. 13 is an illustration of an example position relationship between an identified region and an object identification mark in the X-axis direction according to the first exemplary embodiment.
Figure 14:
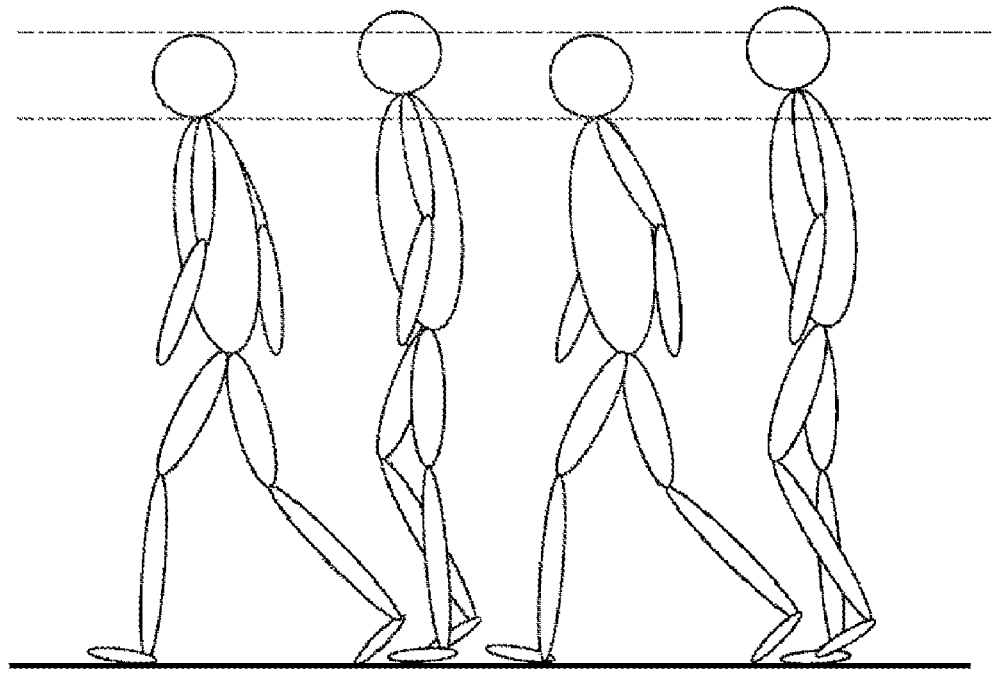
FIG. 14 is an illustration of an example up-and-down motion of a walking subject according to an aspect of the present invention.
Figure 14:
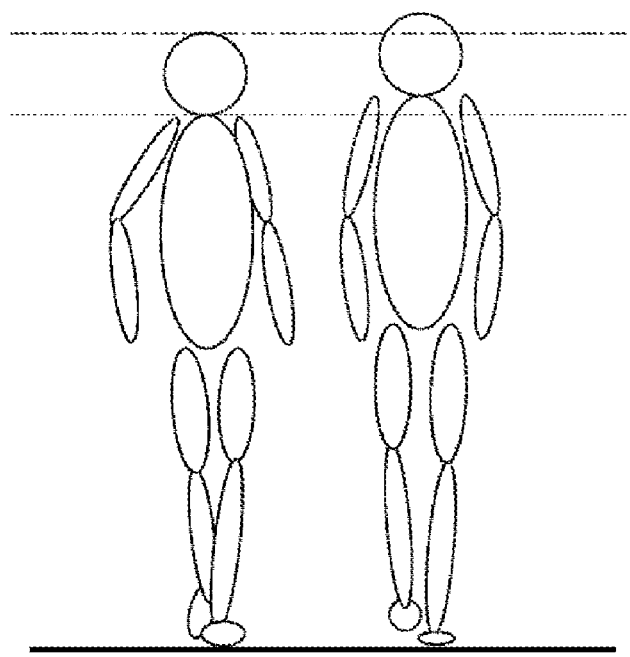
Figure 15:
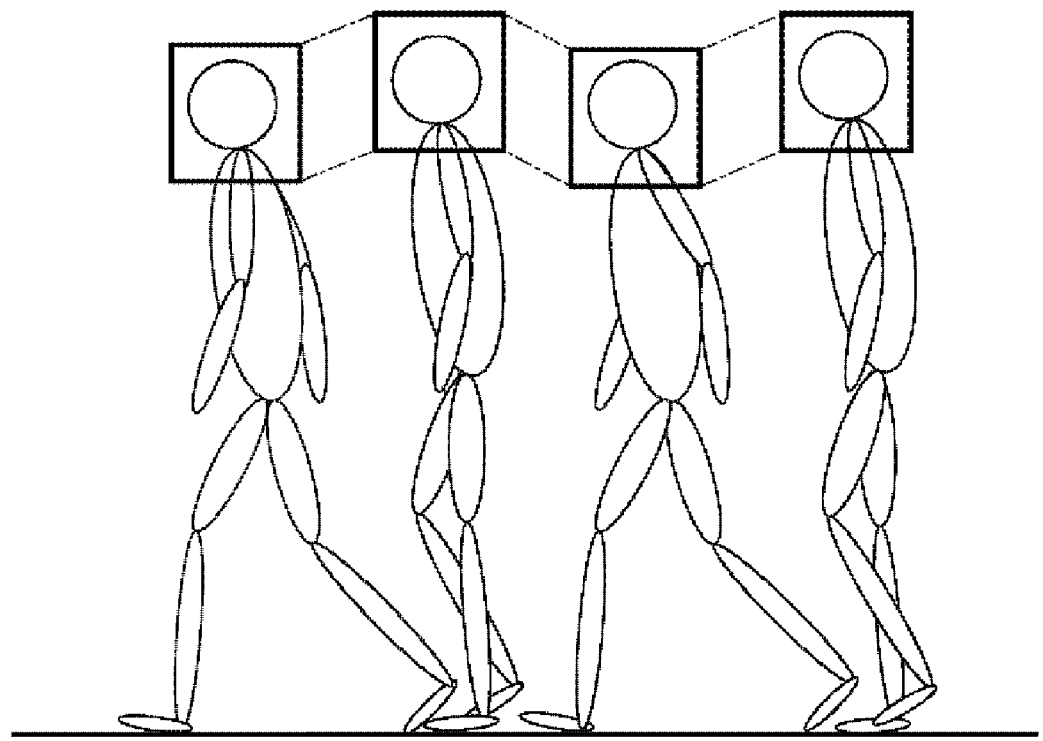
FIG. 15 is an illustration of a conventional method for displaying an object identification mark relative to an identified region.

FIG. 13 illustrates a positional relationship between an mark and an identified region, when the change in the Y-axis direction exceeds the reference value A2. FIG. 13 illustrates an exemplary shooting subject (i.e., identification object) first walking down a slope, then stepping down, and walking on a flat surface.

When the shooting subject is walking on a descending slope or stepping down, the position difference between the mark and the identified region may exceed the reference value A2 before the variable N reaches 5. If the up-and-down motion of the identified region exceeds the reference value A2, the Y-axis coordinate value can be properly updated each time. Thus, the mark can follow up the identified region with higher response characteristics comparable to the follow-up operation in the X-axis direction.

In this manner, the present exemplary embodiment can prevent the mark from frequently shifting in the up-and-down direction in response to the up-and-down motion of a walking subject. Meanwhile, the present exemplary embodiment can promptly shift the mark in the lateral direction to accurately follow up the main shooting subject.

Therefore, the present exemplary embodiment can display a mark capable of resembling the actual movement of a main shooting subject viewed and recognized by a user. Thus, the visibility of the mark can be greatly improved.

The present exemplary embodiment separates the difference between an mark and an identified region into X-axis and Y-axis components. However, it is useful to separate the difference components into three or more directions. The mark can be accurately prevented from being frequently updated if a change occurs in the up-and-down direction of a main shooting subject.

Furthermore, the method for detecting a main shooting subject is not limited to the detection of a human face. The main shooting subject (i.e., identification object) may be any other moving object.

Moreover, it is useful to lower the follow-up response of an mark when a main shooting subject shows an up-and-down motion in an automotive vehicle or an electric car. Additionally, it is useful to enable a user to arbitrarily select the follow-up response characteristics of an mark.

Second Exemplary Embodiment

Next, another exemplary embodiment of the identified region display processing performed in step S113 of FIG. 3 will be described. According to the flowchart of FIG. 4, the update period for updating the position of the mark indicating the identified region in the Y-axis direction is enlarged when the identified region changes in the Y-axis direction due to the up-and-down motion of a walking subject.

The second exemplary embodiment is characterized in that a ratio of a shift distance of the mark relative to a distance between the mark and an identified region in the Y-axis direction is small compared to a ratio in the X-axis direction.

More specifically, the follow-up speed of the mark in the Y-axis direction is slow compared to the follow-up speed in the X-axis direction. Thus, by slowing the movement of the mark in the Y-axis direction, the follow-up response characteristics of the mark can be differentiated depending on a shift direction of the main shooting subject.

[Exemplary Identified Region Display Processing]

Figure 5:
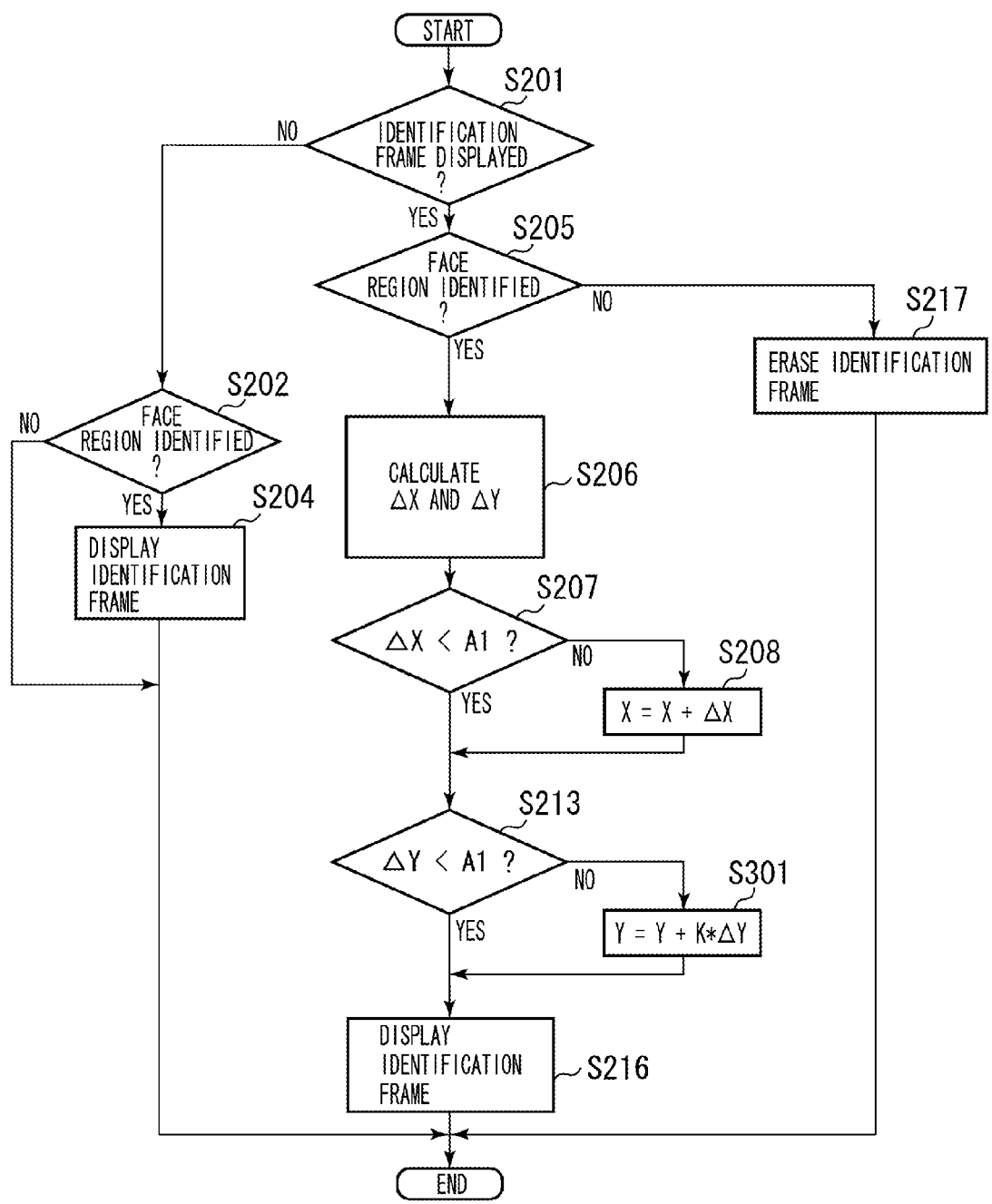
FIG. 5 is a flowchart illustrating example details of identified region display processing performed by the imaging apparatus according to a second exemplary embodiment.

FIG. 5 is a flowchart illustrating example details of identified region display processing performed by the imaging apparatus according to the second exemplary embodiment, wherein steps similar to those of FIG. 4 are denoted by the same step numbers.

In step S201, the display control circuit 117 determines whether an mark (i.e., a frame indicating an identified region) is already displayed on display unit 110 which is set in the observation display state. If the mark is not displayed (NO in step S201), the processing flow proceeds to step S202. If the mark is displayed (YES in step S201), the processing flow proceeds to step S205.

In step S202, the display control circuit 117 determines whether a face region is identified in step S112. If the face region detection is successful (YES in step S202), the processing flow proceeds to step S204. If the face region detection is failed (NO in step S202), the display control circuit 117 terminates the processing of this routine.

The present exemplary embodiment does not enlarge the update period of the mark. Therefore, the processing of step S203 shown in FIG. 4 (i.e., the processing for setting the variable N) is omitted.

In step S204, the display control circuit 117 instructs the digital signal processing circuit 107 to combine the display image data stored in the memory 108 with the mark created based on the coordinate values of the identified region obtained in step S112. Next, the display control circuit 117 causes the display unit 110 to display an image of combined image data crated by the digital signal processing circuit 107. Then, the display control circuit 117 terminates the processing of this routine.

It is desirable to determine the size of the mark so that the mark is sufficiently large to encompass a face of a walking subject who may move in the up-and-down direction, with reference to the size of an identified face.

In step S205, the display control circuit 117 determines whether a face region is identified in step S112. If the face region detection is successful (YES in step S205), the processing flow proceeds to step S206. When the face region detection is failed (NO in step S205), the processing flow proceeds to step S217 in which the display control circuit 117 erases the mark and terminates the processing of this routine.

In step S206, the display control circuit 117 compares the central coordinates (X, Y) of the mark already displayed with central coordinates of the latest identified region involving the main shooting subject. Then, the display control circuit 117 separates the differences of the compared central coordinates into X-axis and Y-axis components, and obtains an X-axis difference $\Delta X$ and a Y-axis difference $\Delta Y$.

In step S207, the display control circuit 117 determines whether the $\Delta X$ value obtained in step S206 is less than the reference value A1. If the $\Delta X$ value is less than the reference value A1 (YES in step S207), the display control circuit 117 maintains the X-axis central coordinate X of the mark. The processing flow proceeds to step S213. If the $\Delta X$ value is equal to or greater than the reference value A1 (NO in step S207), the processing flow proceeds to step S208.

In step S208, the display control circuit 117 adds the $\Delta X$ value to the X-axis central coordinate X of the main shooting subject. Then, the processing flow proceeds to step S213.

In step S213, the display control circuit 117 determines whether the $\Delta Y$ value is less than the reference value A1. If the $\Delta Y$ value is less than the reference value A1 (YES in step S213), the display control circuit 117 maintains the Y-axis central coordinate Y of the mark. The processing flow proceeds to step S216. If the ΔY value is equal to or greater than the reference value A1 (NO in step S213), the processing flow proceeds to step S301.

In step S301, the display control circuit 117 multiplies the ΔY value with a constants K and adds the multiplied value to the Y-axis central coordinate Y of the main shooting subject. The processing flow proceeds to step S216. The constants K is smaller than 1, so that the central coordinates of the main shooting subject can gradually approach the central coordinates of the identified region. The follow-up speed appears raised by increasing the constant K and appears lowered by decreasing the constant K.

In step S216, the display control circuit 117 instructs the digital signal processing circuit 107 to display the maintained mark, or a new mark created based on the updated central coordinates. Then, the display control circuit 117 causes the display unit 110 to display a composite image of the image data produced from the digital signal processing circuit 107. Then, the display control circuit 117 terminates the processing of this routine.

As apparent from the foregoing description, the present exemplary embodiment can control the movement of the mark to follow up an identified region by an amount smaller than a distance between the mark and the identified region, exclusively in the Y-axis direction corresponding to the up-and-down motion of a walking subject. Thus, the mark can follow up an identified region with an appropriate time constant.

On the other hand, no time constant is set for a follow-up operation in the X-axis direction. Thus, similar to the first exemplary embodiment, the mark can promptly follow up a main shooting subject if the main shooting subject shifts in the lateral direction.

Therefore, similar to the first exemplary embodiment, the present exemplary embodiment can display an mark capable of resembling the actual movement of a main shooting subject viewed and recognized by a user. Thus, the visibility of the mark can be greatly improved.

Moreover, similar to the processing of step S301, appropriate constants can be multiplied to the differences between the central coordinates of the mark and the central coordinates of the latest identified region of the main shooting subject in both the X-axis direction and the Y-axis direction.

If the constant for the X-axis direction is larger than the constant for the Y-axis direction, the shift amount of the mark relative to a deviation between the identified region and the mark in the Y-axis direction is small compared to the shift amount in X-axis direction.

In this manner, the present exemplary embodiment can reduce the follow-up speed of the mark when a main shooting subject shifts in the vertical direction compared to the follow-up speed in the lateral direction.

If desirable, the addition formula shown in step S210 of FIG. 4 of the first exemplary embodiment can be replaced with the addition formula used in step S301 of FIG. 5 of the present exemplary embodiment.

Third Exemplary Embodiment

Next, another exemplary embodiment of the identified region display processing performed in step S113 of FIG. 3 will be described. The above-described flowchart shown in FIG. 5 uses the reference value A1 to determine updating or maintaining the central coordinates of the mark in both the X-axis direction and the Y-axis direction.

The third exemplary embodiment determines whether the central coordinates of the mark can be updated or maintained, by using the reference value A1 in the X-axis direction and the reference value A2 in the Y-axis direction. In other words, the third exemplary embodiment uses two different reference values (i.e., reference values A1 and A2) to change the follow-up response characteristics of the mark depending on a shift direction of the main shooting subject.

[Exemplary Identified Region Display Processing]

Figure 6:
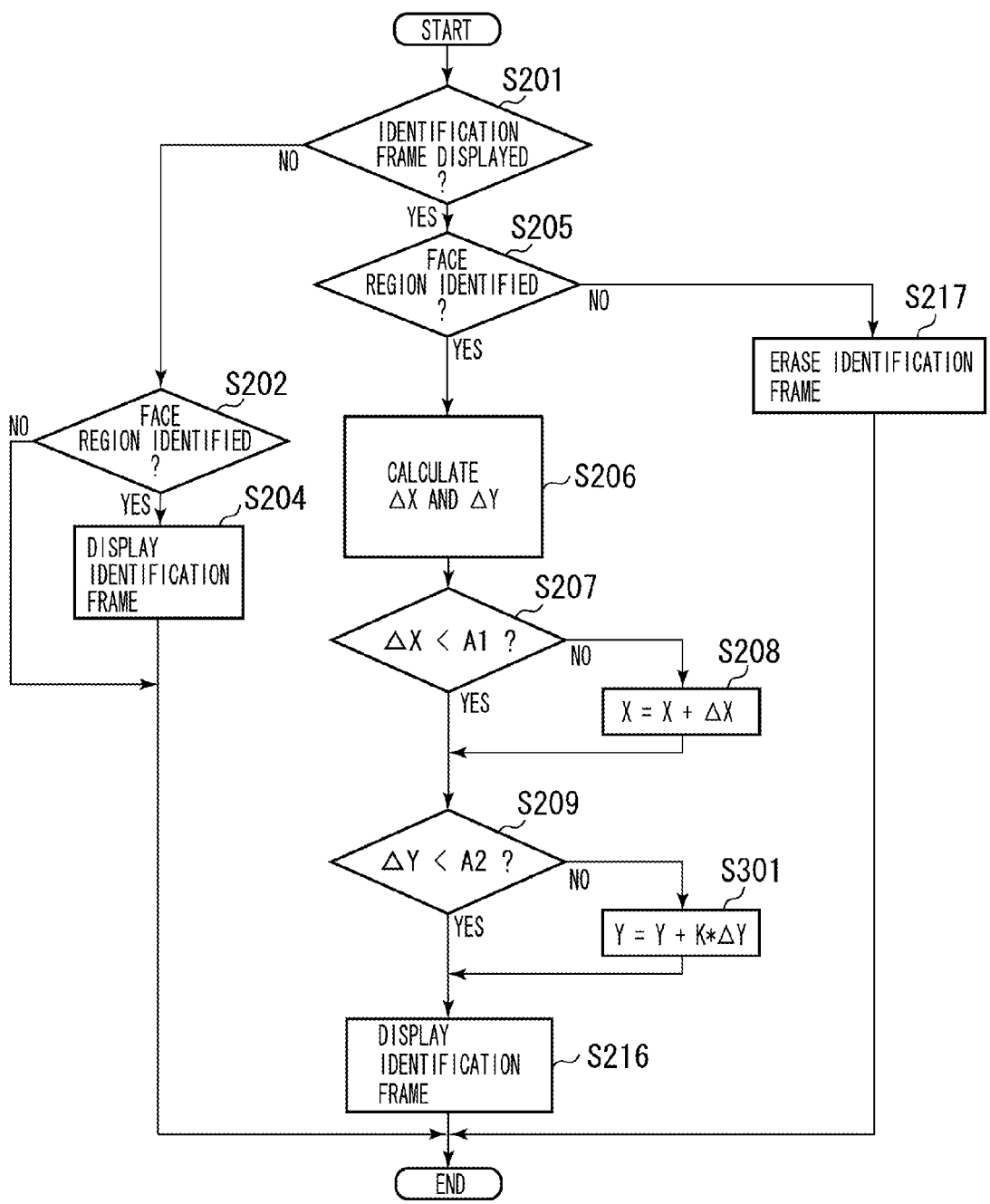
FIG. 6 is a flowchart illustrating example details of identified region display processing performed by the imaging apparatus according to a third exemplary embodiment.

FIG. 6 is a flowchart illustrating example details of identified region display processing performed by the imaging apparatus according to the third exemplary embodiment, wherein steps similar to those of FIG. 5 are denoted by the same step numbers. The third exemplary embodiment is different from the second exemplary embodiment in that the determination of step S213 shown in FIG. 5 is replaced by determination of step S209 of FIG. 6.

In the present exemplary embodiment, in step S206, the display control circuit 117 compares the central coordinates (X, Y) of the mark already displayed with central coordinates of the latest identified region involving the main shooting subject. Then, the display control circuit 117 separates the differences of the compared central coordinates into X-axis and Y-axis components, and obtains an X-axis difference ΔX and a Y-axis difference ΔY.

In step S207, the display control circuit 117 determines whether the ΔX value obtained in step S206 is less than the reference value A1. As described above, the reference value A1 is a sufficiently small value compared to the up-and-down motion of a human body during walking.

If the ΔX value is equal to or greater than the reference value A1 (NO in step S207), the display control circuit 117 adds the ΔX value to the X-axis central coordinate X of the main shooting subject (refer to step S208). When the ΔX value is less than the reference value A1 (YES in step S207), the display control circuit 117 maintains the x-axis central coordinate X of the mark. Then, the processing flow proceeds to step S209.

In step S209, the display control circuit 117 determines whether the ΔY value obtained in step S206 is less than the reference value A2 (which is larger than the reference value A1 used in step S207). The reference value A2 is a value slightly greater than a variation width of the up-and-down motion of a walking subject. The display control circuit 117 uses the reference value A2 to determine whether the shift motion of the identified region in the Y-axis direction is caused by the up-and-down motion of a walking subject.

If the ΔY value is equal to or greater than the reference value A2 (NO in step S209), the display control circuit 117 multiplies the ΔY value with a constants K and adds the multiplied value to the Y-axis central coordinate Y of the main shooting subject (refer to step S301). In other words, the display control circuit 117 updates the Y-axis central coordinate of the mark by the latest Y-axis central coordinate of the identified region of the main shooting subject.

On the other hand, when the ΔY value is less than the reference value A2 (YES in step S209), the display control circuit 117 maintains the Y-axis central coordinate of the mark. Then, the processing flow proceeds to step S216.

As described above, the present exemplary embodiment obtains the differences between the central coordinates of the mark and the central coordinates of the latest identified region of the main shooting subject and determines based on the obtained differences whether the central coordinates of the mark can be updated.

The reference value for the Y-axis difference is larger than the reference value for the X-axis difference. The reference value for the Y-axis direction includes a variation width of the up-and-down motion of a walking subject.

Thus, the present exemplary embodiment can suppress the mark from frequently shifting in the up-and-down in response to the up-and-down motion of a walking subject. On the other hand, the mark can promptly follow up a main shooting subject if the main shooting subject shifts in the lateral direction.

Therefore, the present exemplary embodiment can display an mark capable of resembling the actual movement of a main shooting subject viewed and recognized by a user. Thus, the visibility of the mark can be greatly improved.

Although the present exemplary embodiment includes the processing of step S207 in which the display control circuit 117 determines whether the ΔX value obtained in step S206 is less than the reference value A1, this processing can be omitted if the ΔX value is always added to the X-axis central coordinate X of the main shooting subject.

Fourth Exemplary Embodiment

Furthermore, another exemplary embodiment of the identified region display processing performed in step S113 of FIG. 3 will be described. A fourth exemplary embodiment can determine a change in size of the identified region and also can determine a posture of the image sensor 103.

[Exemplary Identified Region Display Processing]

Figure 7:
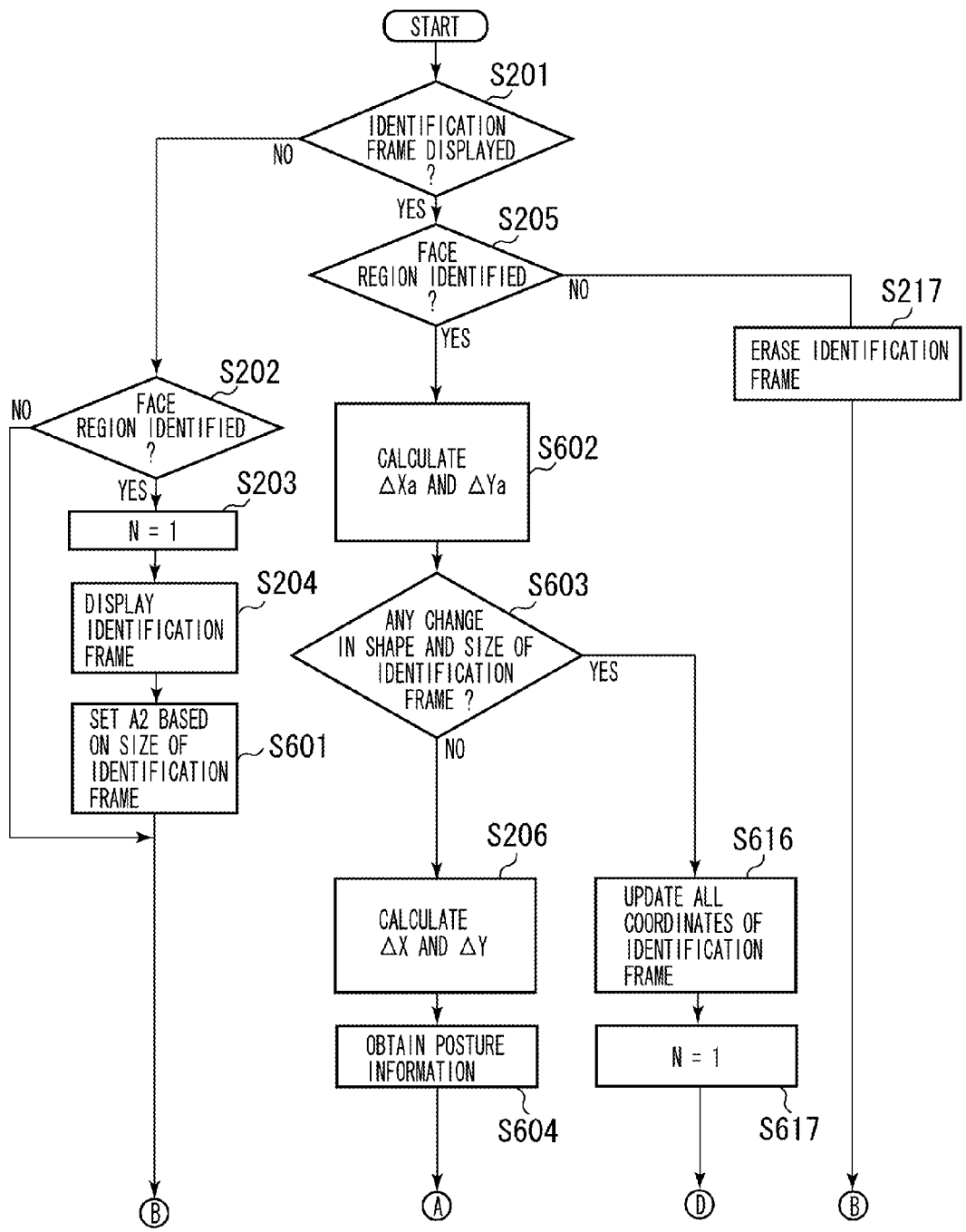
FIG. 7 is a flowchart illustrating example details of identified region display processing performed by the imaging apparatus according to a fourth exemplary embodiment.
Figure 8:
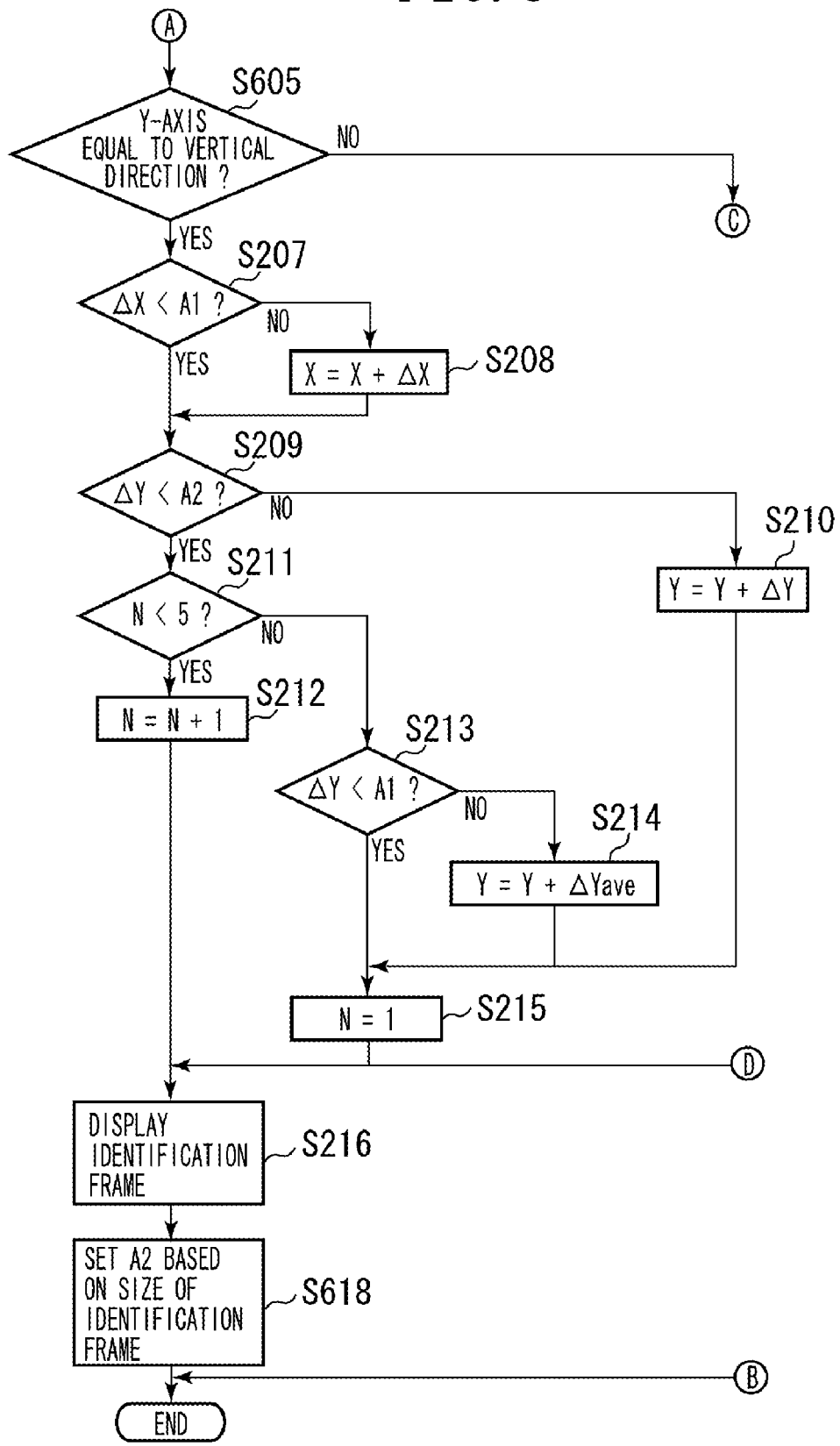
FIG. 8 is a flowchart illustrating example details of identified region display processing performed by the imaging apparatus according to the fourth exemplary embodiment.
Figure 9:
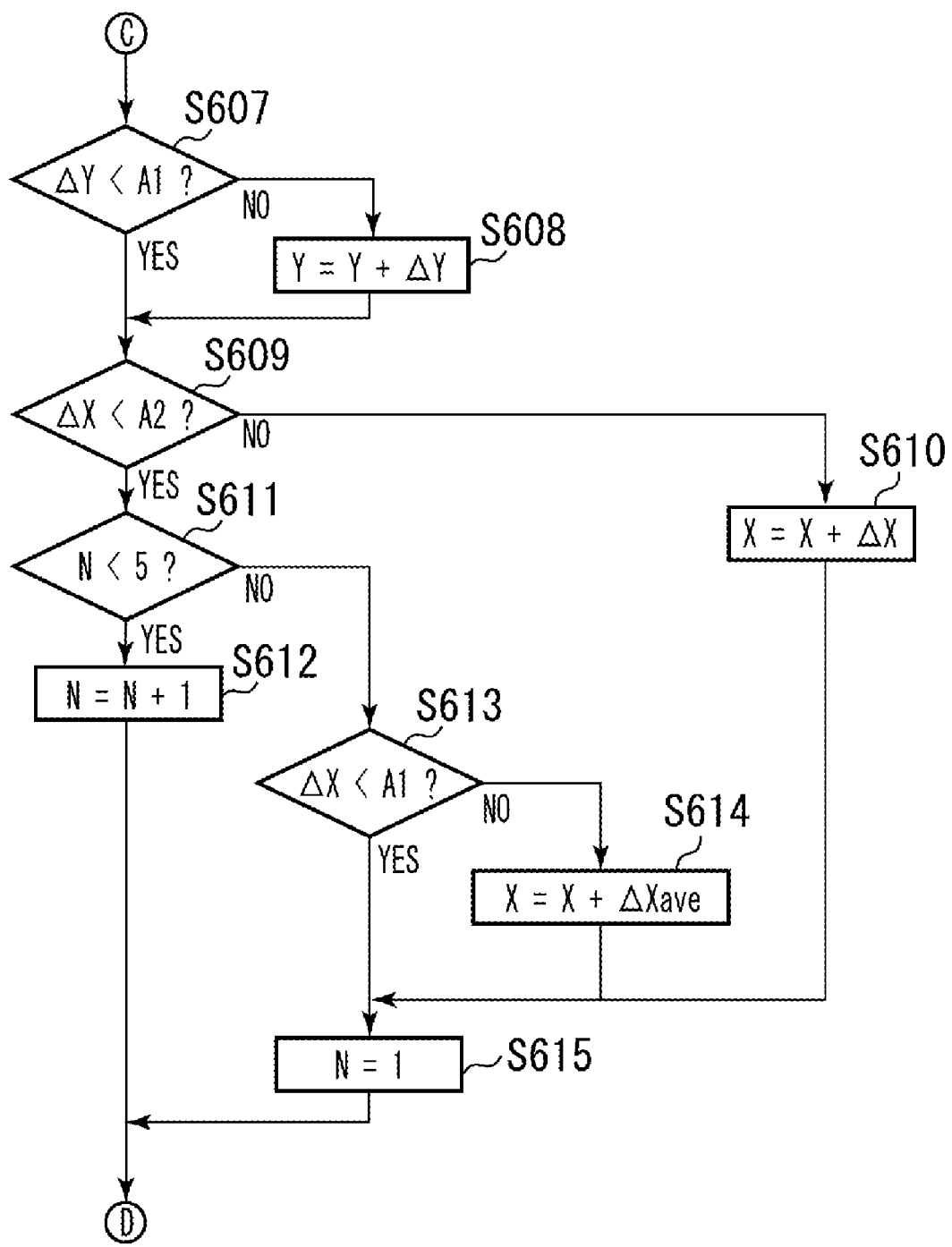
FIG. 9 is a flowchart illustrating example details of identified region display processing performed by the imaging apparatus according to the fourth exemplary embodiment.

FIGS. 7 through 9 are flowcharts illustrating details of the identified region display processing performed by the imaging apparatus according to the fourth exemplary embodiment, wherein steps similar to those of FIGS. 4 through 6 are denoted by the same step numbers.

In step S201, the display control circuit 117 determines whether an mark (i.e., a frame indicating an identified region) is already displayed on display unit 110 which is set in the observation display state. If the mark is not displayed (NO in step S201), the processing flow proceeds to step S202. If the mark is displayed (YES in step S201), the processing flow proceeds to step S205.

In step S202, the display control circuit 117 determines whether a face region is identified in step S112. If the face region detection is successful (YES in step S202), the processing flow proceeds to step S203. If the face region detection is failed (NO in step S202), the display control circuit 117 terminates the processing of this routine.

In step S203, the display control circuit 117 sets a variable N to 1. The processing flow proceeds to step S204. In step S204, the display control circuit 117 instructs the digital signal processing circuit 107 to combine the display image data stored in the memory 108 with the mark created based on the coordinate values of the identified region obtained in step S112. Then, the display control circuit 117 causes the display unit 110 to display an image of combined image data crated by the digital signal processing circuit 107. Then, the processing flow proceeds to step S601.

It is desirable to determine the size of the mark so that the mark is sufficiently large to encompass a face of a walking subject who may move in the up-and-down direction, with reference to the size of an identified face.

In step S601, the display control circuit 117 sets a reference value A2 based on the size of the mark, or based on the size of an identified face.

For example, when a face is large, a main shooting subject is positioned near the imaging apparatus. Thus, when a detected face is large, the up-and-down motion of a walking subject is large. Hence, the present exemplary embodiment sets a large reference value A2 when the mark is large, or when the identified face is large. After an appropriate reference value A2 is set, the display control circuit 117 terminates the processing of this routine.

In step S205, the display control circuit 117 determines whether a face region is identified in step S112. If the face region detection is successful (YES in step S205), the processing flow proceeds to step S602. When the face region detection is failed (NO in step S205), the processing flow proceeds to step S217 in which the display control circuit 117 erases the mark and terminates the processing of this routine.

In step S602, the display control circuit 117 calculates ΔXa (representing a width difference in the X-axis direction between the displayed mark and the identified region) and ΔYa (representing a width difference in the Y-axis direction between the mark and the identified region).

In step S603, the display control circuit 117 determines whether at least one of the ΔXa value and the ΔYa value is in a predetermined level that a general user can recognize a change in the size of face. If there is a significant change (YES in step S603), the processing flow proceeds to step S616 where the display control circuit 117 sets a new mark.

Alternatively, the display control circuit 117 can determine whether a ratio of X-axis and Y-axis widths of the mark, or a ratio of X-axis and Y-axis widths of the identified region, is in a predetermined level that a general user can recognize the change in the direction of face.

If there is a significant change (YES in step S603), the processing flow proceeds to step S616 where the display control circuit 117 sets a new mark. If there is no substantial change in the shape and size of the identified region (NO in step S603), the processing flow proceeds to step S206. In step S616, the display control circuit 117 sets coordinate values and the size of a new mark with reference to the coordinate values of the latest identified region, irrespective of the already displayed coordinate values and the size of the mark.

In step S617, the display control circuit 117 initializes the variable N to 1 in response to the renewal of the mark. Then the processing flow proceeds to step S216 of FIG. 8.

In step S206, the display control circuit 117 compares the central coordinates (X, Y) of the mark already displayed with central coordinates of the latest identified region involving the main shooting subject. Then, the display control circuit 117 separates the differences of the compared central coordinates into X-axis and Y-axis components, and obtains an X-axis difference ΔX and a Y-axis difference ΔY.

In step S604, the display control circuit 117 obtains posture information of the imaging apparatus 100 from the posture detection circuit 116. In the present exemplary embodiment, the posture detection circuit 116 can provide posture information. However, the shooting subject identification circuit 115 can estimate the posture of the image sensor 103 based on the orientation of an identified face. In this case, the posture detection circuit 116 does not obtain posture information. The processing flow proceeds to step S605 of FIG. 8.

In step S605, the display control circuit 117 determines whether a walking subject causes an up-and-down motion in the Y-axis direction or in the X-axis direction, based on the posture information. If the Y-axis direction is the vertical direction (YES in step S605), the processing flow proceeds to step S207. If the Y-axis direction is not the vertical direction (NO in step S605), the processing flow proceeds to step S607 of FIG. 9.

In steps S207 through S215, the display control circuit 117 performs the processing similar to steps S207 through S215 in FIG. 4. Then, the processing flow proceeds to step S216.

Furthermore, in steps S607 through S615 of FIG. 9, the display control circuit 117 performs the processing similar to steps S207 through S215 in FIG. 8 except that the X-axis direction and the Y-axis direction are switched. Then, the processing flow proceeds to step S216.

Then, in step S216, the display control circuit 117 instructs the digital signal processing circuit 107 to display the maintained mark, or a new mark created based on the updated central coordinates. Then, the display control circuit 117 causes the display unit 110 to display a composite image of the image data produced from the digital signal processing circuit 107. Then, the processing flow proceeds to step S618.

In step S618, the display control circuit 117 sets a reference value A2 based on the size of an updated mark, or based on the size of an identified face. Then, the display control circuit 117 terminates the processing of this routine.

As described above, the present exemplary embodiment can change the reference value A2 used for determining a variation width in the up-and-down motion of a walking subject depending on the size of the mark or the size of the identified face. Thus, the present exemplary embodiment can appropriately determine the up-and-down motion of a walking subject with reference to the distance of the main shooting subject.

Moreover, the present exemplary embodiment can use the posture information of the image sensor 103 to adjust the direction corresponding to the up-and-down motion of a walking subject. The present exemplary embodiment can appropriately determine the up-and-down motion of a walking subject even if a user changes the posture or orientation of the imaging apparatus 100.

The direction corresponding to the up-and-down motion of a walking subject is not limited to the above-described X-axis and Y-axis directions. Therefore, it is useful to set three or more directions to accurately identify a direction corresponding to the up-and-down motion of a walking subject and precisely control the follow-up response characteristics of the display frame.

Other Exemplary Embodiments

The above-described exemplary embodiments have been described with reference to the imaging apparatus 100. However, application of the present invention is not limited to an imaging apparatus.

For example, the present invention can be applied to a computer apparatus that can input image data from a monitoring camera and can display an image on a cathode ray tube (CRT) display or other display unit. The computer apparatus can detect a face region from the image data and create an mark based on the identification result, and can cause an associated display unit to display a composite image including the mark.

Moreover, the computer apparatus according to the present invention can obtain image data from an external storage medium or via the Internet and identify a face region from the image data, and can cause an associated display unit to display a composite image including an mark based on the identification result.

In this case, if the image data include posture information, the computer apparatus can determine a direction corresponding to the up-and-down motion of a walking subject based on the posture information.

Furthermore, software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses the means for supplying the program code to a computer, such as a storage (or recording) medium storing the program code. In this case, the type of program can be any one of object code, interpreter program, and OS script data. A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Moreover, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Additionally, an operating system (OS) or other application software running on the computer can execute part or all of the actual processing based on instructions of the programs.

Also, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-6022507 filed Jan. 31, 2006, which is hereby incorporated by reference herein in its entirety.

What is claimed:

1. A method for displaying an image, the method comprising:
   obtaining, from image data, an identified region corresponding to an identification object satisfying a predetermined condition;
   creating an object identification mark indicating the identified region; and
   causing a display unit to display a composite image, including the mark and an image produced based on the image data, such that the mark follows up the identified region,
   wherein the mark is displayed by differentiating an update period for updating a position of the mark depending on the shift direction of the identified region.

2. The display method according to claim 1, wherein the shift direction of the identified region is separated into two or more directions, wherein the mark is displayed by enlarging an update period of the position of the mark in a shift direction corresponding to an up-and-down motion of the identification object compared to an update period of the position of the mark in other shift direction.

3. The display method according to claim 1, wherein the identification object is a walking subject.

4. A method for displaying an image, the method comprising:
   obtaining, from image data, an identified region corresponding to an identification object satisfying a predetermined condition;
   creating an object identification mark indicating the identified region; and
   causing a display unit to display a composite image, including the mark and an image produced based on the image data, such that the mark follows up the identified region,
   wherein the mark is displayed by differentiating a ratio of a shift distance of the mark relative to a distance between the mark and the identified region depending on the shift direction of the identified region.

5. The display method according to claim 4, wherein the shift direction of the identified region is separated into two or more directions, wherein the mark is displayed by reducing a ratio of a shift distance of the mark relative to a distance between the mark and the identified region in a shift direction corresponding to an up-and-down motion of the identification object compared to a ratio of a shift distance of the mark relative to a distance between the mark and the identified region in other shift direction.

6. The display method according to claim 4, wherein the identification object is a walking subject.

7. A method for displaying an image, the method comprising:
   obtaining, from image data, an identified region corresponding to an identification object satisfying a predetermined condition;
   creating an object identification mark indicating the identified region; and
   causing a display unit to display a composite image, including the mark and an image produced based on the image data, such that the mark follows up the identified region,
   wherein when a distance between the mark and the identified region exceeds a reference value, the mark is displayed by updating a position of the mark and differentiating the reference value depending on the shift direction of the identified region.

8. The display method according to claim 7, wherein the shift direction of the identified region is separated into two or more directions, and wherein the mark is displayed by increasing a reference value in a shift direction corresponding to an up-and-down motion of the identification object compared to a reference value in other shift direction.

9. The display method according to claim 7, wherein the identification object is a walking subject.

10. A method for displaying an image, the method comprising:
    obtaining, from image data, an identified region corresponding to an identification object satisfying a predetermined condition;
    creating an object identification mark indicating the identified region;
    causing a display unit to display a composite image, including the mark and an image produced based on the image data, such that the mark follows up the identified region; and
    obtaining posture information of an image sensor that is configured to produce the image data, wherein the mark is displayed by differentiating an update method for updating a position of the mark depending on the posture information and the shift direction of the identified region.

11. A method for displaying an image, the method comprising:
    obtaining, from image data, an identified region corresponding to an identification object satisfying a predetermined condition;
    creating an object identification mark indicating the identified region; and
    causing a display unit to display a composite image, including the mark and an image produced based on the image data, such that the mark follows up the identified region,
    wherein the mark is displayed by differentiating an update method for updating a position of the mark based on focus distance information of a lens associated with an image sensor that is configured to produce the image data as well as based on the shift direction of the identified region.

12. A storage medium storing program code executable by a computer apparatus, the medium storing the following instructions:
    computer-executable instructions for obtaining, from image data, an identified region corresponding to an identification object satisfying a predetermined condition;
    computer-executable instructions for creating an object identification mark indicating the identified region;
    computer-executable instructions for causing a display unit to display a composite image including the mark and an image produced based on the image data, in such a manner that the mark can follow up the identified region; and
    computer-executable instructions for displaying the mark by differentiating an update period for updating a position of the mark depending on the shift direction of the identified region.

13. A storage medium storing program code executable by a computer apparatus, the medium storing the following instructions:
- computer-executable instructions for obtaining, from image data, an identified region corresponding to an identification object satisfying a predetermined condition;
- computer-executable instructions for creating an object identification mark indicating the identified region;
- computer-executable instructions for causing a display unit to display a composite image including the mark and an image produced based on the image data, in such a manner that the mark can follow up the identified region; and
- computer-executable instructions for displaying the mark by differentiating a ratio of a shift distance of the mark relative to a distance between the mark and the identified region depending on the shift direction of the identified region.

14. A storage medium storing program code executable by a computer apparatus, the medium storing the following instructions:
- computer-executable instructions for obtaining, from image data, an identified region corresponding to an identification object satisfying a predetermined condition;
- computer-executable instructions for creating an object identification mark indicating the identified region;
- computer-executable instructions for causing a display unit to display a composite image including the mark and an image produced based on the image data, in such a manner that the mark can follow up the identified region; and
- computer-executable instructions for displaying the mark by updating a position of the mark and differentiating the reference value depending on the shift direction of the identified region, when a distance between the mark and the identified region exceeds a reference value.

15. An imaging apparatus comprising:
- an acquisition unit configured to obtain an identified region corresponding to an identification object satisfying a predetermined condition from image data obtained by an image sensor;
- a creation unit configured to create an object identification mark indicating the identified region; and
- a display control unit configured to cause a display unit to display a composite image, including the mark and an image produced based on the image data, such that the mark can follow up the identified region,
- wherein the display control unit causes the display unit to display the mark by differentiating an update period for updating a position of the mark depending on the shift direction of the identified region.

16. An imaging apparatus comprising:
- an acquisition unit configured to obtain an identified region corresponding to an identification object satisfying a predetermined condition from image data obtained by an image sensor;
- a creation unit configured to create an object identification mark indicating the identified region; and
- a display control unit configured to cause a display unit to display a composite image, including the mark and an image produced based on the image data, such that the mark can follow up the identified region,
- wherein the display control unit causes the display unit to display the mark by differentiating a ratio of a shift distance of the mark relative to a distance between the mark and the identified region depending on the shift direction of the identified region.

17. An imaging apparatus comprising:
- an acquisition unit configured to obtain an identified region corresponding to an identification object satisfying a predetermined condition from image data obtained by an image sensor;
- a creation unit configured to create an object identification mark indicating the identified region; and
- a display control unit configured to cause a display unit to display a composite image, including the mark and an image produced based on the image data, such that the mark can follow up the identified region,
- wherein when a distance between the mark and the identified region exceeds a reference value, the display control unit causes the display unit to display the mark by updating a position of the mark and differentiating the reference value depending on the shift direction of the identified region.

* * * * *